US009881292B2

(12) United States Patent
Hicks et al.

(10) Patent No.: US 9,881,292 B2
(45) Date of Patent: *Jan. 30, 2018

(54) POINT OF SALE (POS) DOCKING STATION SYSTEM AND METHOD FOR A MOBILE BARCODE SCANNER GUN SYSTEM WITH MOBILE TABLET DEVICE OR STAND ALONE MOBILE TABLET DEVICE

(71) Applicant: RETAIL TECHNOLOGIES CORPORATION, Orlando, FL (US)

(72) Inventors: Bruce J. Hicks, Windermere, FL (US); Brian K. McWhirter, Winter Garden, FL (US)

(73) Assignee: RETAIL TECHNOLOGIES CORPORATION, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,344

(22) Filed: Jan. 30, 2017

(65) Prior Publication Data

US 2017/0140363 A1 May 18, 2017

Related U.S. Application Data

(60) Continuation-in-part of application No. 14/999,048, filed on Mar. 23, 2016, now Pat. No. 9,558,482,
(Continued)

(51) Int. Cl.
*G06K 15/00* (2006.01)
*G06Q 20/20* (2012.01)
(Continued)

(52) U.S. Cl.
CPC .......... *G06Q 20/208* (2013.01); *G06K 7/109* (2013.01); *G06K 7/10297* (2013.01);
(Continued)

(58) Field of Classification Search
CPC .......... G06F 1/1626; G06Q 10/063118; G06Q 10/06; G06K 7/1091
(Continued)

(56) References Cited

U.S. PATENT DOCUMENTS

| 5,324,922 A * | 6/1994 | Roberts | ............... G06Q 10/087 235/375 |
|---|---|---|---|
| 6,853,293 B2 | 2/2005 | Swartz et al. | ............... 340/5.92 |

(Continued)

FOREIGN PATENT DOCUMENTS

| EP | 1205895 | 5/2002 | ............. G06Q 20/00 |
|---|---|---|---|
| WO | WO/2014/056100 | 4/2014 | ............... G06F 1/16 |

*Primary Examiner* — Daniel St Cyr
(74) *Attorney, Agent, or Firm* — Ernest D. Buff & Associates, LLC; Ernest D. Buff, Esq.; Margaret A. LaCroix, Esq.

(57) ABSTRACT

A mobile scanner gun system processes a POS sale transaction and performs real-time daily store level inventory management. The system includes a main body portion extending toward a handle portion and forms an interior cavity and an aperture with a lens. A plurality of Universal Serial Bus (USB) mobile input devices are attached to the mobile scanner gun, including a barcode scanner and payment card input devices including a "Magnetic Stripe Reader" (MSR) and a "Europay, MasterCard and Visa" (EMV) reader, both with USB access to a PIN Entry Device (PED) and a "Near Field Communications" (NFC) reader through a specialized universal serial bus wiring harness. The specialized universal series bus wiring harness is adapted to be attached to and communicate with the mobile tablet device for communicating with a system integrated therein that enables store level real-time inventory management and a fully functioning POS capability for selling merchandise in a retail sales environment. A main Printed Circuit Board (PCB) having a previously programmed Electrically Erasable Programmable Read-Only Memory (EE-
(Continued)

PROM) controlling all MSR, EMV or NFC operations through the corresponding payment card input devices of each. When a customer payment card is swiped through the MSR slot or dipped into EMV reader or tapped on the NFC reader for payment card processing, customer payment is processed through the proper secured bank card processing network.

20 Claims, 36 Drawing Sheets

Related U.S. Application Data which is a continuation-in-part of application No. 14/121,323, filed on Aug. 19, 2014, now Pat. No. 9,430,681, which is a division of application No. 13/783,089, filed on Mar. 1, 2013, now Pat. No. 8,856,033.

(60) Provisional application No. 61/751,906, filed on Jan. 13, 2013.

(51) Int. Cl.
*G06Q 10/10* (2012.01)
*G06K 7/10* (2006.01)
*G06Q 20/32* (2012.01)
*G06Q 20/40* (2012.01)

(52) U.S. Cl.
CPC ....... *G06K 7/10762* (2013.01); *G06Q 10/107* (2013.01); *G06Q 20/202* (2013.01); *G06Q 20/203* (2013.01); *G06Q 20/204* (2013.01); *G06Q 20/209* (2013.01); *G06Q 20/3278* (2013.01); *G06Q 20/405* (2013.01)

(58) Field of Classification Search
USPC .................................. 705/17; 235/385, 383
See application file for complete search history.

(56) References Cited

U.S. PATENT DOCUMENTS

| | | | |
|---|---|---|---|
| 7,010,501 B1 | 3/2006 | Roslak et al. | 705/23 |
| 7,913,912 B2* | 3/2011 | Do | G06K 17/0022 235/462.45 |
| 8,020,756 B2 | 9/2011 | Brown et al. | 235/379 |
| 8,235,289 B2* | 8/2012 | Hsu | G06Q 20/20 235/383 |
| 8,235,294 B2* | 8/2012 | Miller | G06K 7/0004 235/462.46 |
| 8,250,187 B2 | 8/2012 | Cacheria, III et al. | 709/221 |
| 8,255,499 B2 | 8/2012 | Cacheria, III et al. | 709/221 |
| 8,255,500 B2 | 8/2012 | Cacheria, III et al. | 709/221 |
| 8,719,103 B2 | 5/2014 | Bouaziz et al. | 705/17 |
| 8,856,033 B2* | 10/2014 | Hicks | G07G 1/0081 235/385 |
| 9,077,796 B2 | 7/2015 | Gittleman et al. | |
| 9,430,681 B2* | 8/2016 | Hicks | G06K 7/10881 |
| 9,558,482 B2* | 1/2017 | Hicks | G07G 1/0081 |
| 2011/0290876 A1* | 12/2011 | Graves | G06F 1/1626 235/385 |
| 2013/0290591 A1 | 10/2013 | Schwarzkopf et al. | 710/303 |
| 2015/0286252 A1 | 10/2015 | Barone et al. | 710/304 |

* cited by examiner

Fixed POS Docking Station Functional Block Diagram
Of Major Electrical Components Docking Connector Printed Circuit Board (PCB1)

Fig. 5

Table 1 - Connector 101 Signals

| 101 - Tablet Gun Connector Signals |
|---|
| *Signal* |
| DC Power for Tablet Gun |
| Electrical Logic Common (Ground) |
| Tablet Gun Ethernet |
| Tablet Gun USB |
| Tablet Gun RS-232C Serial Port |
| Tablet Gun Dock Detect Signal |
| Tablet Gun External Scan Button Signal |
| Magnetic Stripe Reader Programming Port |
| Tablet Gun Debug and Diagnostics Port |

Fig. 6

Table 2 - Primary Electronics Printed Circuit Board Connectors (PCB2)

| 103 - Primary Electronics PCB Connectors (PCB2) | |
|---|---|
| Connector | Description |
| J1 | External Power Interface (to AC mains) |
| J2 | 4 port Ethernet connector |
| J3 | 2 port USB connector |
| J4 | 2 port USB connector |
| J5 | MSR Programming USB Port |
| J6 | Tablet Gun Debug and Diagnostics USB Port |
| J7 | RS-232C Asynchronous Serial Port |
| J8 | External Scan Switch Connector |
| J9 | Tablet Gun Docking Interface Cable Connector |
| J10 | 12V Powered USB Port |
| J11 | 12V Powered USB Port |
| J12 | 24V Powered USB Port |

34002

POINT OF SALE (POS) DOCKING STATION SYSTEM AND METHOD FOR A MOBILE BARCODE SCANNER GUN SYSTEM WITH MOBILE TABLET DEVICE OR STAND ALONE MOBILE TABLET DEVICE

CROSS-REFERENCE TO RELATED APPLICATIONS

This is a continuation-in-part application of U.S. patent application Ser. No. 14/999,048, filed Mar. 24, 2016, entitled "Point Of Sale (POS) Docking Station System And Method For A Mobile Barcode Scanner Gun System With Mobile Tablet Device Or Stand Alone Mobile Tablet Device", now U.S. Pat. No. 9,558,482, which in turn is a continuation-in-part application of U.S. patent application Ser. No. 14/121,323, filed Aug. 19, 2014, entitled "Mobile Barcode Scanner Gun System With Mobile Tablet Device Having A Mobile POS And Enterprise Resource Planning Application For Customer Checkout/ Order Fulfillment And Real Time In Store Inventory Management For Retail Establishment", now U.S. Pat. No. 9,430,681, which in turn is a divisional application of U.S. patent application Ser. No. 13/783089, filed Mar. 1, 2013, entitled "Mobile Barcode Scanner Gun System With Mobile Tablet Device Having A Mobile POS And Enterprise Resource Planning Application For Customer Checkout/ Order Fulfillment And Real Time In Store Inventory Management For Retail Establishment", now U.S. Pat. No. 8,856,033, which in turn is a nonprovisional application of U.S. Prov. Pat. App. No. 61/751,906, filed Jan. 13, 2013, entitled "Mobile Barcode Scanner Gun System With Mobile Tablet Device Having A Mobile POS And Enterprise Resource Planning Application For Customer Checkout/ Order Fulfillment And Real Time In Store Inventory Management For Retail Establishment"; the disclosures of which are hereby incorporated in their entirety by reference thereto.

FIELD OF THE INVENTION

The system and method of the present invention relates to providing mobile barcode scanner guns and fixed point of sale docking stations for the mobile barcode scanner guns, in which a mobile barcode scanner gun can now be used similarly to any other industry standard fixed point of sale terminal without limiting its immediate capability as a portable mobile tablet device, with customer check out and inventory management capability throughout the retail establishment.

DESCRIPTION OF THE PRIOR ART

Current mobile tablet device docking stations typically provide a source for charging the mobile device. For example, once the mobile tablet device battery is low, the device is inserted into the charging station and left there until the mobile tablet device is fully charged. Other mobile tablet devices can be inserted into a fixed point of sale workstation and used as the main processor and data input device; however, the immediate portability of the mobile tablet device is not available. Consequently, the mobile tablet device cannot operate both within the fixed point of sale workstation and removed from the point of sale workstation seamlessly and in the middle of operational transactions. This lack of operational portability impedes the employee of the retail establishment from servicing its customers when mobility is required to checkout customers in a dynamic retail store environment such as outdoor garden center, high customer traffic periods of time or kiosk sales in a mall environment. Further, while performing inventory management functions out on the retail floor with typical RF guns, these mobile devices cannot be immediately inserted into the fixed point of sale workstation and perform a customer check out transaction and then migrate back to a mobile inventory management device for such tasks as product look-up, barcode ticket printing, inventory receiving, store transfers and physical inventory cycle counting and then reinserted back into the fixed point of sale workstation and resume their customer check out operation specifically where it had been suspended and complete the customer check out transaction.

Based on the foregoing, there exists a need in the art for a mobile scanner gun system fixed point of sale docking station, which provides the ability for the mobile scanner gun system to migrate from doing daily inventory management such as physical inventory, cycle counting, inventory receiving, store to store transfers, return to vendor, and product re-ticketing, while at the same time providing the ability for processing point of sale (POS) sales transactions via Wi-Fi and cellular communication, to become docked into a fixed point of sale docking station which transforms the mobile scanner gun system into a full featured point of sale workstation connected to the point of sale server via Ethernet on the fixed store local area network. Further, there exists a need for the mobile scanner gun system to communicate via the fixed point of sale docking station with a standard point of sale printer and cash drawer via a fixed Ethernet or USB connection along with any standard USB barcode scanner and a standard payment terminal via Ethernet, USB or serial connection while docked in the fixed point of sale docking station. By providing the convertibility for the mobile scanner gun system into a fixed point of sale docking station, the overall technology cost to manage the typical retail store will be significantly reduced and customer service is significantly increased due to the multi-function capability afforded by the unique combination of operations between the mobile scanner gun system and the mobile scanner gun system's fixed point of sale docking station. Currently, that combination of retail systems operations are performed by both industry standard fixed point of sale terminals and industry standard mobile RF guns used for store inventory management.

SUMMARY OF THE INVENTION

The subject invention provides a Tablet Gun or a Stand-Alone Mobile Tablet that converts into an integrated point of sale (POS) terminal through the use of a fixed POS docking station. A Tablet Gun or a Stand-Alone Mobile Tablet customized for use as a mobile POS terminal is converted from its many mobile retail store systems operations into an integrated POS terminal. The conversion is effected instantaneously, while the Tablet Gun or a Stand-Alone Mobile Tablet is being docked into the fixed POS docking station, without consideration to previous operations being performed on the mobile barcode scanner gun system or stand-alone mobile tablet.

The fixed POS docking station comprises a Base Housing Assembly with a Base Mounting Plate on the bottom that provides the ability to attach the fixed POS docking station to an under cabinet mounting system for security and stability purposes. The Base Housing Assembly also has a detachable rear port cover, which provides access for connecting USB, Ethernet, and Serial wiring to their corresponding connection ports in the rear of the Base Housing Assembly. On the top of the Base Housing Assembly, there is an integrated scanner activation button for integrating the barcode scanner to the mobile barcode scanner gun system or stand-alone mobile tablet when it is docked in the fixed POS docking station, an integrated PIN entry device (PED) for customer PIN entry which may be required to complete a customer sales transaction for a variety of payment cards and an integrated Near Field Communications (NFC) module that may be required for a variety of NFC transactions, including but not limited to Apple Pay and Google Wallet. Inside the Base Housing Assembly there is a primary printed circuit board (PCB2) to manage the various USB, Ethernet and Serial connectivity options as well as external power. These include a 10/100 Ethernet switch with 4 ports, two USB hubs each with 4 ports, an RS-232 Serial debug port, a Micro USB debug port, a Micro USB payment card processing devices (MSR) programming port, a scan switch interface and an external power supply connector. Payment card processing devices contemplated include those heretofore known and/or utilized in the payment card processing field, including, but not limited to, Magnetic Stripe Reader (MSR), computer card chip technology ("Europay, MasterCard, and Visa" (EMV), and Near Field Communication (NFC) communication protocols enabling two electronic devices, one of which is usually a portable device such as a smartphone, to establish communication by bringing them within 4 cm (1.57") of each other. An EMV reader input device for carrying out and processing sales transactions may be located on an upper receiver alongside a short edge of the mobile tablet device and directly below the MSR and above the scanner, said EMV reader being end to end encrypted through to the bank card authorization processor for payment card industry compliance requirements. A near field communication (NFC) reader input device for carrying out and processing sales transactions is preferably located within the upper receiver and can be located under the LCD panel or along the inside of the bottom casing in front of the rotational base mount receiver on the same edge as the MSR and EMV readers or integrated within the top of the Base Housing Assembly of the fixed POS docking station and made available for the customer to "tap" their NFC device in very close proximity of the NFC module, said NFC reader being end to end encrypted through to the bank card authorization processor for payment card industry compliance requirements. A PIN entry device (PED) with integrated security shrouding for carrying out and processing sales transactions which require the customer to enter in a Personal Identification Number (PIN) necessary to complete certain payment card sales transactions that may be used by the MSR or the EMV reader preferably located within the top of the Base Housing Assembly facing the customer for easy access to entering their PIN to complete their sales transaction. Security shrouding is used on the top edge and both sides of the PIN entry device (PED) as required by PCI security standards.

Assembled and integrated on the top of the Base Housing Assembly is the tilting and rotational mechanism that connects the Base Housing Assembly to the Upper Housing Assembly. The tilting mechanism with rotation allows for the Upper Housing Assembly to rotate 360 degrees and tilt 90% degrees "toward" or "away" from the user throughout its 360 degree rotation, which permits the accelerometer in the mobile tablets to rotate its viewing orientation, thus allowing users facing the fixed POS docking station from any position to view proper display orientation as the pivot arm is rotated "toward" the user or "toward" the customer. The tilting mechanism is robust in design and can use a metal or hardened plastic assembly for strength, durability, and consistency of resistance during movement when rotating and tilting the Upper Housing Assembly.

The Upper Housing Assembly is designed to house the Tablet Gun/mobile barcode scanner gun system or stand-alone mobile tablet in a "cradle fashion" with a tablet cradle enclosure designed to fit snuggly around the mobile barcode scanner gun system or stand-alone mobile tablet providing stability and a look of integration. The Upper Housing Assembly also has an extended table top completely surrounding the tablet cradle enclosure for additional hand support and comfort for the user and a more thorough look of integration. This table top extension of the cradle will preferably vary in length from one inch upwards to six inches. When inserted into the Upper Housing Assembly, the top of the mobile barcode scanner gun system or stand-alone mobile tablet is smooth and consistent with the Upper Housing Assembly's table top to provide a consistent flush surface for both the user and the customer in operating the mobile barcode scanner gun system or stand-alone mobile tablet's touch screen user interface, giving them both an ergonomic design that affords the user to rest the bottom of their palm away from the touchscreen touch points while operating the touch screen. This unique combination of docking the mobile barcode scanner gun system or stand-alone mobile tablet into the Upper Housing Assembly of the fixed POS docking station transforms two distinctly separate devices into a single integrated Fixed POS Terminal in an instant. For ease of extracting the mobile barcode scanner gun system or stand-alone mobile tablet, there are two finger slot recessions on each side of the long edge of the Upper Housing Assembly. These two finger slot recessions facilitate quick and easy removal of the mobile barcode scanner gun system or stand-alone mobile tablet.

For larger stand-alone mobile tablets up to fifteen inches diagonal, the option exists to eliminate the mobile tablet removable "cradle effect" of the Upper Housing Assembly and permanently attach the Stand-Alone Mobile Tablet onto the Upper Housing Assembly. Exercising this option creates a true Fixed Mobile Tablet POS terminal. The presence of this additional systemic configuration option adds even more value to the fixed POS docking station.

The Upper Housing Assembly has two 10 pin electrical (spring loaded) pogo pin connectors integrated with a secondary printed circuit board (PCB1) and are located within the base of the "cradle" and are connected to the primary printed circuit board (PCB2) through a Custom Interface Cable, which facilitates the electrical connection between the fixed POS docking station and the mobile barcode scanner gun system or stand-alone mobile tablet. The connection is made as the mobile barcode scanner gun system or stand-alone mobile tablet is docked into the Upper Housing Assembly and an electrical connection is made between two matched 10 pin electrical plates located on the bottom of the Upper Receiver of the mobile barcode scanner gun system or stand-alone mobile tablet with two 10 pin electrical pogo pin connectors on the base of the Upper Housing Assembly, thus providing continuous electrical connection between the mobile barcode scanner gun system or stand-alone mobile tablet and the PCB2 electronics housed within the Base Housing Assembly. Once this electrical connection is made, all USB ports, Ethernet ports, debugging Serial port and power port housed within the Base Housing Assembly are fully accessible to the mobile barcode scanner gun system or stand-alone mobile tablet and can be connected to a variety of POS peripheral devices such as USB and Ethernet receipt printers with attached cash drawers, USB Barcode Scanners, USB and Ethernet Payment Terminals, USB and Ethernet Weighted Scales, USB and Ethernet Coupon Printers and other store systems peripheral devices that could provide additional functionality and enhanced value to the fixed POS docking station operating within a retail establishment.

As an additional feature built within the Upper Housing Assembly, there are four magnets located toward each corner of the bottom of the Upper Housing Assembly. These magnets are paired with four magnetic slugs installed in matching locations on each corner of the Upper Receiver of the mobile barcode scanner gun system or stand-alone mobile tablet. When the mobile barcode scanner gun system or stand-alone mobile tablet is docked within the fixed POS docking station, the magnets connect with the magnetic slugs and ensure the electrical connection is consistently made and will not be disrupted during operation where rotation and pivoting of the Upper Housing Assembly is regularly performed and could disrupt the electrical connection. Further, it is contemplated that additional fasteners, such as Cam-Locks® or other industry standard fasteners may be used to secure the Upper Receiver of the mobile barcode scanner gun system or stand-alone mobile tablet to the Upper Housing Assembly of the fixed POS docking station where magnets might not suffice to ensure an uninterruptable connection both 10 pin electrical pogo pin connectors.

Additionally, The Upper Housing Assembly has a structural feature that allows the MSR and EMV payment card reader devices of the mobile barcode scanner gun system or stand-alone mobile tablet to operate while docked in the fixed POS docking station by mirroring the slots at the end of the Upper Housing Assembly, allowing a payment card to pass through the MSR payment card processing device and inserted into the EMV reader device installed within/operable with the mobile barcode scanner gun system or stand-alone mobile tablet without restriction. Additionally, the MSR and EMV readers can access a customer PIN entry device (PED), which may be required to complete certain payment card transactions. The PIN entry device is located and integrated within the top of the Base Housing Assembly of the fixed POS docking station and accessed via the custom USB wiring harness. Payment card processing devices contemplated include those heretofore known and/or utilized in the payment card processing field, including, but not limited to, Magnetic Stripe Reader (MSR), computer card chip technology ("Europay, MasterCard, and Visa" (EMV), and Near Field Communication (NFC) communication protocols enabling two electronic devices, one of which is usually a portable device such as a smartphone, a "chip embedded" payment card, such as all-in-one cards or "smart cards", or other industry standard NFC payment devices that are presently disclosed and utilized and/or may be developed over time, to establish communication by bringing them within a set range of one another, such as for nonlimiting example about 4 cm (1.57") within range of each other.

The Upper Housing Assembly also accommodates the operation of the barcode scanner installed on mobile barcode scanner gun system or stand-alone mobile tablet through the barcode scanner switch located on the top of the Base Housing Assembly. There is an opening directly under the slot built into the Upper Housing Assembly used for the payment card processing device operation and is large enough to allow the barcode scanner installed on the mobile barcode scanner gun system or stand-alone mobile tablet to properly operate the barcode scanner while the mobile barcode scanner gun system or stand-alone mobile tablet is docked in the fixed POS docking station through the use of the barcode scanner switch located on the top and to one side of the Base Housing Assembly.

As an additional feature, the Upper Housing Assembly can be converted to accommodate and integrate a variety of Stand-Alone Mobile Tablet's running Windows, Android, iOS and other mobile operating systems preferably ranging from five inches in diagonal size to fifteen inches in diagonal size. These custom mobile tablets can have an integrated MSR/other payment card processing device and may also have an integrated barcode scanner. The Upper Housing Assembly wiring harness can be modified to integrate to a variety of standard and custom power, USB, powered USB, Ethernet, Serial and other such typical connectors as each tablet may have designed into it. Additionally, the Upper Housing Assembly can be modified to ensure that each tablet is seamlessly integrated to the Upper Housing Assembly without a cradle. In this conFiguration, the Stand-Alone Mobile Tablet can be permanently fastened to the Upper Housing Assembly, thus creating a Permanent fixed POS docking station.

Further enhancing the usability of this conFiguration, a secondary "tilting" feature at the point of integration between the Stand-Alone Mobile Tablet and the Upper Housing Assembly allows for the Stand-Alone Mobile Tablet itself to tilt ninety degrees down "toward" the user or "away" from the user on a secondary tilting armature. This feature is designed for the convenience of cashiers and typical retail customers in everyday use; it also provides handicap access to both cashiers and customers alike who cannot physically position themselves above a typical industry standard POS terminal on a retail countertop and operate it, given the physical requirements necessary to do so making the subject invention even more valuable.

The mobile scanner gun system for processing a retail store point of sale (POS) transaction and performing real-time daily store level inventory management functions comprises a main body portion extending toward a handle portion forming a mobile scanner gun. The main body portion has a top wall, side walls, a front wall and a back wall constructed to form an interior cavity, wherein the front wall includes an aperture with a lens recessed therein. A plurality of Universal Serial Bus (USB) mobile input devices are adapted to be attached to the mobile scanner gun, including an MSR, an EMV reader, and a Near Field Communications (NFC) reader USB payment card input devices accessed through a specialized universal serial bus wiring harness. The handle portion has a trigger member in communication with the scanner engine for initiating a scan of a barcode. The top wall of the main body portion has an attachment means thereon, wherein the attachment means is adapted to receive a mobile tablet device housing having a MSR slot and being adapted to receive and house therein the mobile tablet device having an application software providing wireless secure communicative capability with a POS store systems server in a retail store, which is connected to a corporate ERP system. The specialized universal series bus wiring harness is adapted to be attached to and communicate with the mobile tablet device for communicating with a system integrated therein that enables store level real-time inventory management and a fully functioning POS capability for selling merchandise in a retail sales environment, the specialized universal serial bus wiring harness being removable from the top wall of the main body portion and adapted to be readily docked in different base housings, including portable housings and fixed docked workstation housings, thereby providing portability and interchangeability. A Main Printed Circuit Board (PCB) is provided with a previously programmed Electrically Erasable Programmable Read-Only Memory (EEPROM). The EEPROM controls all USB payment card input devices including the MSR, EMV, fixed POS docking station PIN entry device (PED) or NFC operations and actions of each USB payment card input device when a customer payment card is swiped through the MSR slot or an EMV reader and by inserting a customer payment card into the EMV reader slot or an NFC reader and by "tapping" a customer payment card against the NFC reader for processing customer payment through the proper secured bank card processing network. The MSR, EMV or NFC operations cause the EEPROM of the Main PCB to communicate with the mobile tablet device, launching the application software to ready the mobile tablet device for receiving customer payment card data. The POS store systems server contacts a bank card authorization processor approving the purchase, communicating formatted customer data securely to the POS store systems server and respective PCI certified bank card processing network and communicating to the mobile tablet device that the customer payment card has been approved for scanned merchandise purchased. The system allows the customer to purchase a product from any retail store employee having the mobile scanner gun system. That employ receives full product details, price, electronic and physical coupons, promotions, customer loyalty data and rewards, and charges the purchase in a friendly, efficient, informative atmosphere without having the need to bring the product to a central checkout station and waiting in queue to check out.

In another aspect, a mobile scanner gun system is provided for use with a mobile tablet device having a USB mobile Magnetic Stripe Reader (MSR) input device and application software providing wireless secure communicative capability with a store systems server in a retail store, which is connected to a corporate Enterprise Resource Planning (ERP) system for processing a retail store point of sale (POS) transaction and real-time daily store level inventory management functions. The system comprises a main body portion extending toward a handle portion forming a mobile scanner gun. The main body portion has a top wall, side walls, a front wall and a back wall constructed to form an interior cavity, wherein the front wall includes an aperture with a lens recessed therein. A plurality of Universal Serial Bus (USB) mobile input devices is attached to the mobile scanner gun, including an MSR with a card swipe slot, an EMV reader with a card dip slot, and a Near Field Communications (NFC) reader through a specialized universal serial bus wiring harness. The handle portion has a trigger member in communication with the scanner engine for initiating a scan of a barcode. The top wall of the main body portion has an attachment means thereon, wherein the attachment means comprises a base mount universal receiver adapted to interchangeably mount a mobile tablet device housing further adapted to receive and house therein the mobile tablet device through a specialized universal serial bus wiring harness and communicate with the mobile tablet, the universal receiver and specialized universal serial bus wiring harness being removable from the top wall of the main body portion and adapted to be readily docked in different base housings including portable housings and fixed docked workstation housings, thereby providing portability and interchangeability. A Main Printed Circuit Board (PCB) having a previously programmed Electrically Erasable Programmable Read-Only Memory (EEPROM) is provided for controlling all MSR, EMV or NFC operations and actions of the MSR input device when a customer payment card is swiped through the MSR slot or an EMV reader; and by inserting a customer payment card into the EMV reader slot or an NFC reader; and by "tapping" a customer payment card against the NFC reader for processing customer payment through the proper secured bank card processing network. The MSR, EMV, with or without PIN entry device input or NFC operations causes the EEPROM of the Main PCB to communicate with the mobile tablet device, launching the application software to ready the mobile tablet device for receiving customer payment card data. The system allows for capability for a customer to purchase a product from any retail store employee having the mobile scanner gun system receiving full product details, price, electronic and physical coupons, promotions, customer loyalty data and rewards and charges the purchase in a friendly, efficient, informative atmosphere without having the need to bring the product to a central checkout station and waiting in queue to check out.

Another aspect of the invention is directed to a system providing a non-transitory computer readable electronic storage medium storing one or more programs comprising instructions executable by a portable multifunction device having a touch screen display and Internet capability to cause the device to: display an icon connected to an inventory management application associated with the corporate ERP system that provides store level access on a mobile scanner gun system to the ERP system through StoreMobileRF™; display an icon connected to a POS application, StoreMS Mobile™ that can process customer sales transactions within the store without limitation to the physical location of the inventory within the retail chain; enable the portable multifunction mobile tablet device to be operative to establish a connection between the mobile tablet device and the mobile scanner gun system and to be mountable thereon; wherein when triggered, the system provides relevant inventory information and POS transaction capability; as well as the ability to process a payment card transaction through the MSR slot or the EMV slot or tapping on the NFC reader.

BRIEF DESCRIPTION OF THE DRAWING

The invention will be more fully understood and further advantages will become apparent when reference is had to the following detailed description of the preferred embodiments of the invention and the accompanying drawing, in which:

FIG. 5 is a table, Table 1, of Connector 101 signals;

FIG. 6 is a table, Table 2, of Primary Electronics Printed Circuit Board Connectors (PCB2);

DETAILED DESCRIPTION OF THE INVENTION

Figure 1:
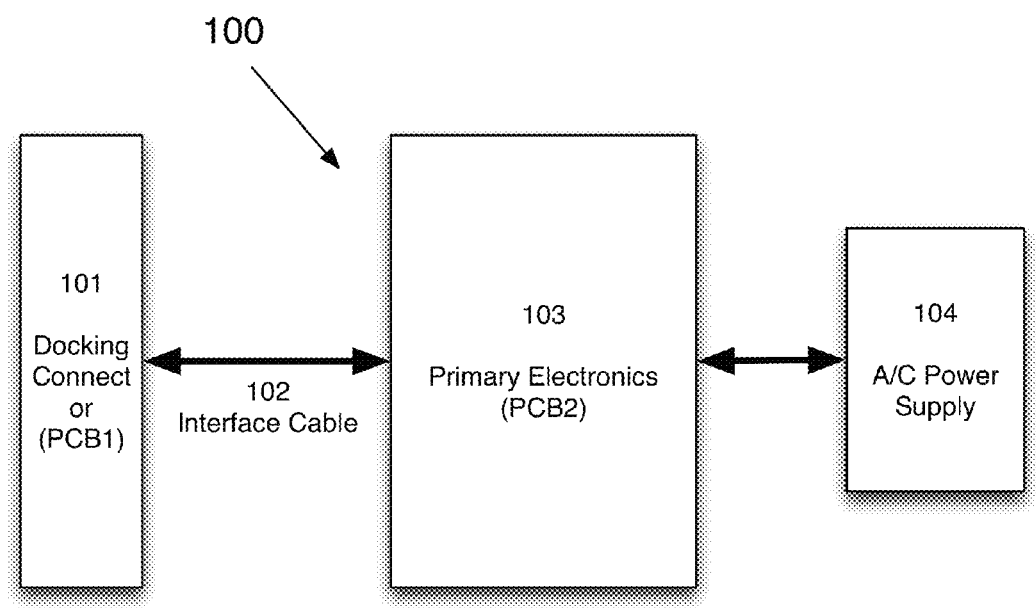
FIG. 1 is a block diagram illustrating the main electrical components of the subject Tablet Gun or mobile tablet docked within the fixed POS docking station.

The subject invention is directed toward the mobile barcode scanner gun system or stand-alone mobile tablet transforming into a fixed point of sale (POS) terminal through the use of the subject invention fixed POS docking station. Advantageously, the mobile barcode scanner gun system or stand-alone mobile tablet, customized for use as a mobile store systems terminal, is transformed into an integrated fixed POS terminal while being docked into the fixed POS docking station. This transformation is instantaneous, and is effected without consideration to any operation being performed on the mobile barcode scanner gun system or stand-alone mobile tablet.

As used herein, the term "fixed" means a docking station wherein the portable mobile device is docked or placed for charging, providing access to a power supply, providing a docking base, and to peripheral devices or auxiliary features. The docking station itself may be on a fixed terminal or on a mobile terminal or cart with wheels, for example.

The term "Tablet Gun", as used herein, means a mobile barcode scanner gun system or a mobile barcode scanner gun system with mobile tablet device having a mobile POS and enterprise resource planning application for customer checkout/order fulfillment and real time in store inventory management for retail establishment, as disclosed by U.S. Pat. No. 8,856,033.

The term "Stand-Alone Mobile Tablet" is intended to mean a mobile tablet device having software to execute a mobile POS and enterprise resource planning application for customer checkout/order fulfillment and real time in store inventory management for retail establishment.

The term "Payment card processing device(s)" means card processing devices heretofore known and/or utilized in the payment card processing field, including, but not limited to, Magnetic Stripe Reader (MSR), computer card chip technology ("Europay, MasterCard, and Visa" (EMV), ancillary PIN entry device (PED) which can be used in conjunction with both the MSR and EMV readers to complete secured "PIN based" (Personal Identification Number) customer payment transactions, Near Field Communication (NFC) communication protocols enabling two electronic devices, one of which is usually a portable device such as a smartphone, to establish communication by bringing them within 4 cm (2 in) of each other, and/or other "proximity card" technologies.

The retail store purchasing system has a plurality of wearable mobile scanner systems with mobile tablet devices integration capability therein adapted to be carried by employees. Each wearable mobile scanner system, such as the tablet gun herein, comprises a mobile tablet device attached to a wearable base housing directly below it, and connected by a base mount universal receiver with rotational coupling. The Main PCB has an EEPROM controlling operations of a USB scanner, MSR and EMV reader. The mobile tablet device has an application which allows wireless communication with a POS store systems server and also commands the EEPROM. A customer's purchase of a product requires an employee to scan a product by activating a button on the palm or along the index finger of said wearable mobile scanner system. This scanned data is received by the mobile tablet device through the Main PCB to the mobile tablet device USB port and is sent wirelessly to the POS store systems server to obtain product data concerning description, price, inventory and promotions. When the customer decides to purchase a scanned product, the employee enters a purchasing screen of the application in the mobile tablet device and enters customer data including the employee's e-mail address and swiped payment card. Again customer data is sent through the Main PCB to the mobile tablet device USB port and is wirelessly communicated to the POS store systems server and corporate ERP system, which processes the order and sends an email to the customer, and prints a hard copy receipt and updates inventory.

There are five primary functional features of the subject fixed POS docking station that in combination, provide unique capability and value that no other conventional docking station provides. The first primary attribute is simplicity in its operation. The subject fixed POS docking station enables the user to simply release the mobile barcode scanner gun system or stand-alone mobile tablet down into the Upper Housing Assembly and the integrated fixed POS docking station is immediately available to the user to either continue "work in progress" or begin a new task or start entirely new store systems application. The second primary feature is the exact reversal of the first primary attribute. The user simply pulls the mobile barcode scanner gun system or stand-alone mobile tablet out of the Upper Housing Assembly and the mobile barcode scanner gun system or stand-alone mobile tablet is immediately available for wireless operation via Wi-Fi or cellular means of networked communication. The third primary feature constitutes the provision of electronic access to additional USB, Ethernet and Serial peripheral POS devices common to industry standard fixed POS terminals directly to the mobile barcode scanner gun system or stand-alone mobile tablet that has been inserted into the fixed POS docking station. The fourth primary feature comprises an overall rugged and durable fixed POS docking station design that will ensure that the integrated fixed POS docking station, comprising the mobile barcode scanner gun system or stand-alone mobile tablet and the fixed POS docking station, can withstand constant daily use within a typical store selling floor environment for the life of the device. The fifth primary feature constitutes the provision of charging power to the mobile barcode scanner gun system or stand-alone mobile tablet battery circuitry without impact to the ongoing operational capabilities of the mobile barcode scanner gun system or stand-alone mobile tablet. The combination of these five primary features makes the subject fixed POS docking station even more valuable.

The user simply releases/places the mobile barcode scanner gun system or stand-alone mobile tablet down into the Upper Housing Assembly and the mobile barcode scanner gun system or stand-alone mobile tablet is guided or channeled into the Upper Housing Assembly to fit snugly in the "cradle" with no more than gravitational force exercised and a combination of four magnets to maintain a secure docking connection. Once cradled, the mobile barcode scanner gun system or stand-alone mobile tablet is physically matched to two spring loaded 10 pin electrical pogo pin connectors integrated within the Upper Housing Assembly with two corresponding 10 pin electrical plates integrated on the bottom of the mobile barcode scanner gun system or stand-alone mobile tablet. The electrical connection between the two 10 pin electrical pogo pin connectors and the two corresponding 10 pin electrical plates becomes sturdier by using a combination of four magnets integrated in close proximity of each corner on the bottom of the Upper Housing Assembly or stand-alone mobile tablet. Once the mobile barcode scanner gun system or stand-alone mobile tablet has been inserted/released into the Upper Housing Assembly, the newly "integrated" Fixed POS Terminal is immediately available to the user, who can then resume systemic operations of whatever application task presently in progress or begin a new task or application if desired.

The second primary feature is the exact reversal of the first primary feature. The user simply pulls the mobile barcode scanner gun system or stand-alone mobile tablet up and out of the Upper Housing Assembly and the mobile barcode scanner gun system or stand-alone mobile tablet using their thumb and index finger inserted into the provided "recesses" on each side of the longest edge of the Upper Housing Assembly. The mobile barcode scanner gun system or stand-alone mobile tablet is immediately available to the user to either continue working within the application previously in use while docked or begin a new task or application. Upon removal of the mobile barcode scanner gun system or stand-alone mobile tablet, the device is now running on its own batteries and operating over Wi-Fi or Cellular means of networked connectivity without any operational disruption whatsoever.

The third primary feature provides electronic access to additional USB, Ethernet and Serial peripheral devices, common to industry standard fixed POS terminals, directly from the mobile barcode scanner gun system or stand-alone mobile tablet upon insertion into the fixed POS docking station. While operating as a mobile device, the mobile barcode scanner gun system or stand-alone mobile tablet is somewhat limited in their capability to operate peripheral POS hardware such as POS receipt printers, POS payment terminals, weighted scales, coupon printers, flat-bed barcode scanners, additional hand held scanners and customer displays and they simply cannot connect via Ethernet to a store network. Once the mobile barcode scanner gun system or stand-alone mobile tablet is docked within the fixed POS docking station, they have electronic access to seven USB ports, comprising of four standard non powered USB ports, two 12V powered USB ports and one 24V powered USB port, 4 10/100 Ethernet ports, a Micro USB debug port, a Micro USB MSR programming port and a scan switch interface corresponding to a scanner actuator mounted on the top of the Base Housing Assembly, and/or a plurality of USB ports adapted to receive USB mobile input devices including an MSR, an EMV reader, a PIN entry device (PED) and a Near Field Communications (NFC) reader. Consequently, the mobile barcode scanner gun system or stand-alone mobile tablet can now access and support a wide variety of POS peripheral hardware typical to fixed POS terminals such as industry standard POS Receipt Printers, POS Payment Terminals, Weighted Scales, Coupon Printers, Flat-Bed Barcode Scanners, Additional Hand Held Scanners, Customer Displays and other POS peripheral hardware.

The fourth primary feature is an overall rugged and durable fixed POS docking station design that will ensure that the integrated Fixed POS Terminal, comprised of both the mobile barcode scanner gun system or stand-alone mobile tablet and the fixed POS docking station, can withstand constant daily use within a typical store selling floor environment for the life of the device, which preferably will be as long as 5 to 7 years and beyond.

The fifth primary feature provides charging power to the mobile barcode scanner gun system or stand-alone mobile tablet's internal battery circuitry without impact to the operational capabilities of either device. Inasmuch as the Tablet Gun and Stand-Alone Mobile Tablet are mobile POS/generic store systems terminals using Wi-Fi or Cellular means of networked communication within their operating environment, either device operates using an internal battery source. As each device depletes its battery charge, it is important in a fluid retail environment that the mobile barcode scanner gun system or stand-alone mobile tablet can be docked within the fixed POS docking station and continue to perform its typical store systems application operations as needed while recharging the mobile barcode scanner gun system or stand-alone mobile tablet's internal batteries simultaneously.

Operationally, the mobile barcode scanner gun system or stand-alone mobile tablet can be converted from a mobile store systems device, operating free from a fixed terminal or workstation via Wi-Fi or Cellular means of communication, to a Fixed POS Terminal simply by inserting the mobile barcode scanner gun system or stand-alone mobile tablet into the Upper Housing Assembly. Once inserted into the fixed POS docking station, the mobile barcode scanner gun system or stand-alone mobile tablet has a number of additional POS peripheral devices it can access through the electrical (EE) design of the fixed POS docking station. Those additional systemic capabilities are provided through specific electronic components including four 10/100 Ethernet ports, seven USB ports, comprised of four standard non powered USB ports, two 12V powered USB ports and one 24V powered USB port, two micro USB ports, one RS-232 Serial debug port, a scan switch interface and a power port available to the mobile barcode scanner gun system or stand-alone mobile tablet.

The electrical connectivity between the Tablet Gun or the Stand-Alone Mobile Tablet and the fixed POS docking station is made through an integrated secondary printed circuit board (PCB1) and two 10 pin electrical pogo pin connectors mounted within the Upper Housing Assembly with two 10 pin electrical connection points and two matching electrical plates each with 10 individual contacts mounted on the underside of the Tablet Gun or mobile tablet. To ensure a stable and consistent electrical connection is made each and every time with the mobile barcode scanner gun system or stand-alone mobile tablet, there are four magnets mounted at each corner on the bottom of the Upper Housing Assembly and four corresponding magnetic slugs on each corner of the underside of the Upper Receiver of the mobile scanner gun system or stand-alone mobile tablet.

The fixed POS docking station has a Base Housing Assembly that preferably ranges from 8 inches to 14 inches front to back, 8 inches to 14 inches left to right and stands 1 to 3 inches in height. The size of the Base Housing Assembly directly correlates to the size of the mobile barcode scanner gun system or stand-alone mobile tablet that will be used in the Upper Housing Assembly. The larger and heavier the mobile device used in the Upper Housing Assembly, the bigger the Base Housing Assembly needs to be for overall balance and stability.

Inside the Base Housing Assembly resides a variety electrical components. These electrical components are all integrated into the primary printed circuit board (PCB2). Integrated within the PCB2 are the following electrical components: A 10/100 Ethernet Switch with 4 external ports, two USB Switches totaling eight (8) external ports, an RS-232 Serial debug port, a Micro USB debug port, a Micro USB MSR programming port, a scan switch interface and an external power supply connector.

In further electrical (EE) detail, the fixed POS docking station is an exemplary embodiment of a method for "docking" the mobile barcode scanner gun system or stand-alone mobile tablet for recharging purposes, as well as to break out signals from the mobile barcode scanner gun system or stand-alone mobile tablet and connect peripheral devices in a manner such as to create a fully functional POS system. In order to accomplish these goals, the fixed POS docking station embodies a number of connectors, cables and electronics, in a custom enclosure that accommodates the unique form factor of the fixed POS docking station.

Figure 2:
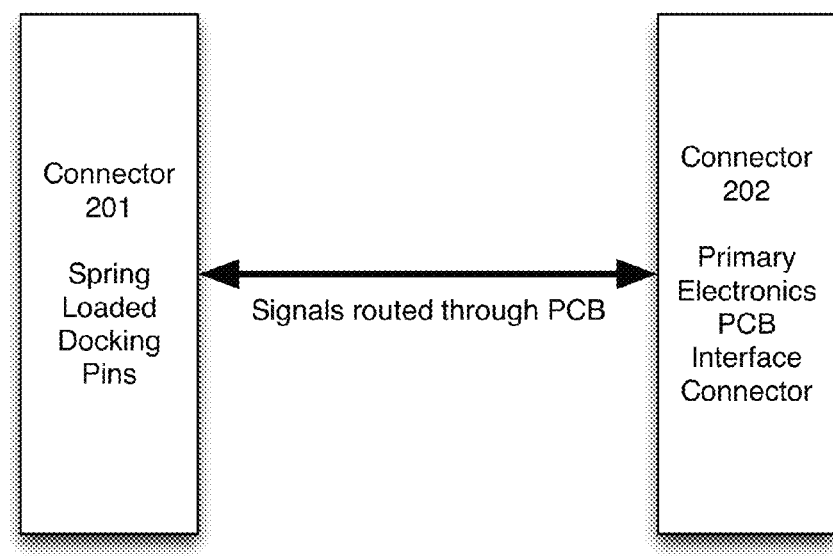
FIG. 2 is a block diagram illustrating the docking connector printed circuit board (PCB1) of FIG. 1.
Figure 3:
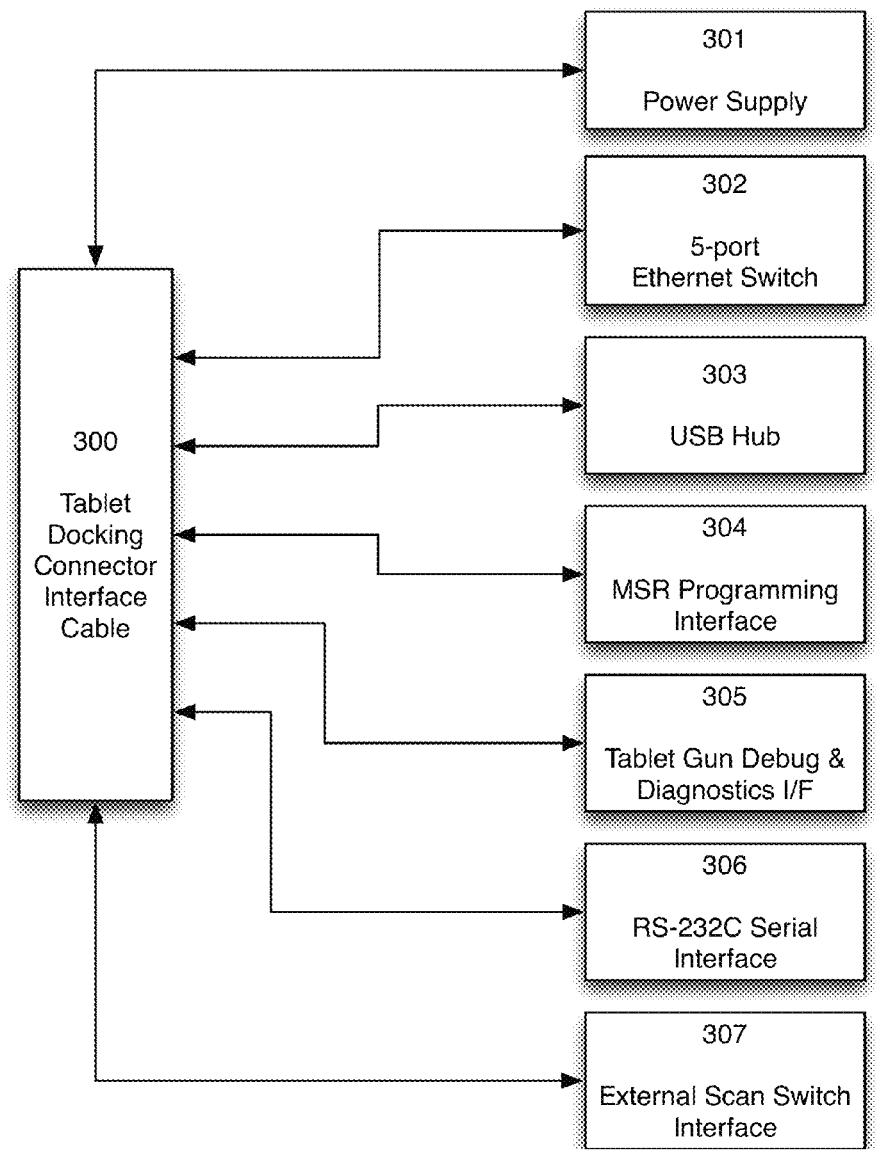
FIG. 3 is a block diagram illustrating the primary electronics printed circuit board (PCB2) of FIG. 1.
Figure 4:
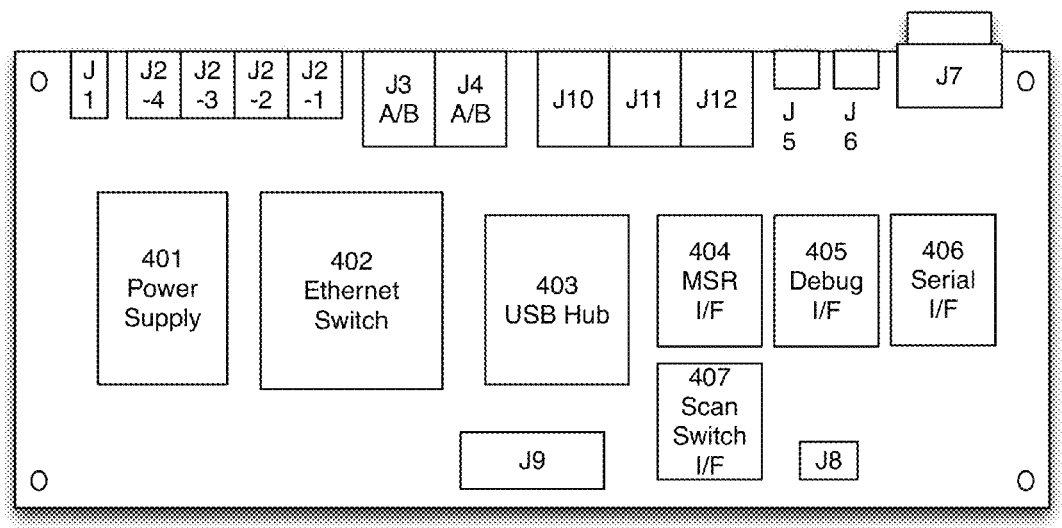
FIG. 4 is a schematic showing the primary electronics printed circuit board (PCB2) layout.

FIG. 1 shows a block diagram of the main electrical components of the subject Tablet Gun or mobile tablet docked within the fixed POS docking station, shown generally at 100. FIG. 2 illustrates a block diagram of the docking connector printed circuit board (PCB1) of FIG. 1. FIG. 3 illustrates a block diagram of the primary electronics printed circuit board (PCB2) of FIG. 1. FIG. 4 illustrates a schematic showing the primary electronics printed circuit board (PCB2) layout. FIG. 5 illustrates a table, Table 1, of Connector 101 signals. FIG. 6 illustrates a table, Table 2, of Primary Electronics Printed Circuit Board Connectors (PCB2).

Referring to FIGS. 1-6, the fixed POS docking station functionality is provided by a Docking Connector Interface Secondary Printed Circuit Board (PCB1) shown as in FIG. 1 at 101, having a Custom Interface Cable 102 interfacing with a Primary Printed Circuit Board (PCB2) 103. An external power supply is shown at 104.

The PCB1 interface 101 provides the primary direct electrical interface to the mobile barcode scanner gun system or stand-alone mobile tablet when it is inserted into the fixed POS docking station. In order to do this, PCB1 utilizes a set of spring loaded electrical pogo pins, shown in FIG. 2 at 201, which mate with matching electrical contacts on the mobile barcode scanner gun system or stand-alone mobile tablet. These pins carry power to the mobile barcode scanner gun system or stand-alone mobile tablet, as well as USB data signals, Ethernet data signals, RS-232C serial data signals, dock detection signals, magnetic stripe reader (MSR) data signals, and external scan button signals. The I/O carried on the connector is listed in Table 1 of FIG. 5. Signals are carried using routed copper traces on PCB1 from the pogo pin connector 201 through the circuitry of PCB1 to the Custom Interface Cable Connector 202, which allows attachment of the Custom Interface Cable 102, FIG. 1, which connects PCB1 101, FIG. 1 to PCB2 103.

The fixed POS docking station Interface Cable 102, FIG. 1, consists of a Custom Interface Cable which carries signals from PCB1 101 to PCB2 103. All signals from the mobile barcode scanner gun system or stand-alone mobile tablet are carried to PCB2 103 through this Custom Interface Cable. The cable is designed with flexibility and a protective cable sleeve given the Upper Housing Assembly can move on one or two pivot points in its normal operation.

PCB2 103 breaks out all signals from the Custom Interface Cable 102 and electrically connects the mobile barcode scanner gun system or stand-alone mobile tablet to the various electrical interface components of the fixed POS docking station. As illustrated by way of FIG. 3, these electrical interface components consist of a power supply 301, an onboard Ethernet switch 302, two onboard four port USB hubs 303, a Magnetic Stripe Reader (MSR) programming USB port interface 304, a diagnostics and debug USB port interface 305, an RS-232C asynchronous serial port interface 306, and the external scan switch interface 307.

FIG. 4 shows a typical physical layout of an exemplary implementation of the fixed POS docking station primary electronics PCB2. PCB2 provides a number of connectors in order to interface with both the Custom Interface Cable 102 of FIG. 1 and external devices that are common to a retail store systems POS environment. These external connectors are shown in FIG. 4, and are labeled J1 through J12, and are described in Table 2, set forth as FIG. 6.

The Power Supply 401 of FIG. 4 receives input power from the AC electrical grid through an input power connector J1 and produces DC power at various voltage levels as appropriate to the mobile barcode scanner gun system or stand-alone mobile tablet and to the electronics devices comprising PCB2. The AC main power can optionally be stepped down to lower DC voltages by an external power supply 104 (FIG. 1). Output power from the power supply 401 is distributed through the copper layers of PCB2 to the Custom Interface Cable connector J9 and routed to the custom interface cable 102 (FIG. 1), and to the various electronic components on PCB1.

The Ethernet Switch 402 consists of various components comprising a five (5) port Ethernet switch, with one port connected to the mobile barcode scanner gun system or stand-alone mobile tablet via the Custom Interface Cable connector J9 and the additional four (4) ports being provided for connection of the POS terminal components and other network devices via the 4 port Ethernet port connectors (FIG. 4, J2-1, J2-2, J2-3, J2-4), which is a 4 port Ethernet connector jack. The Ethernet switch 402 acts as a general purpose network switch for POS terminal components even when the Tablet Gun is not docked in the fixed POS docking station. This allows for connection of other networking components that might need to function even when the mobile barcode scanner gun system or stand-alone mobile tablet is not docked within the fixed POS docking station.

The USB hub 403 consists of multiple devices that collectively comprise two 4 port USB hub controllers, including a USB power controller and 7 Type-A USB ports. The external USB ports are made available via dual-USB jacks, J3 and J4, 2 12V USB jacks J10 and J11, and 1 24V USB jack J12, for connection of external POS USB peripherals and other USB devices. USB connectivity to the mobile barcode scanner gun system or stand-alone mobile tablet on the USB hub host port is through USB connector J9. When the mobile barcode scanner gun system or stand-alone mobile tablet is docked, the hub detects the presence of the mobile barcode scanner gun system or stand-alone mobile tablet as the USB master device, and powers up the USB ports and any attached USB peripherals. These USB peripherals may be integrated within the tablet gun, as shown generally in FIGS. 1-22, or may be in communication through a separate unit such as fixed POS docking station 34002 having USB connectivity, as shown generally in FIGS. 34-36. USB peripherals preferably include, alone or in combination, a barcode scanner, MSR and/or EMV payment card readers which have direct USB access to a PIN Entry Device (PED) located within fixed POS docking station 34002 and a Near Field Communications (NFC) reader through a specialized universal serial bus wiring harness. In absence of the mobile barcode scanner gun system or stand-alone mobile tablet, the USB devices may be powered down to conserve power.

The Magnetic Stripe Reader (MSR) interface 404 provides direct USB connectivity between the MSR that is integrated into the mobile barcode scanner gun system or stand-alone mobile tablet via the Custom Interface Cable connector J9 and an external Micro USB connector J5. This allows for reprogramming of encryption data in the MSR device in the mobile barcode scanner gun system or stand-alone mobile tablet as required by the credit card processor.

The Debug and Diagnostics Interface 405 provides a USB host connection between the mobile barcode scanner gun system or stand-alone mobile tablet via the Custom Interface Cable connector J9 and an external Micro USB connector J6. This interface allows for reprogramming, debug and diagnostic operation of the mobile barcode scanner gun system or stand-alone mobile tablet when a PC or laptop system is connected to the external Micro USB connector port J6 prior to insertion of the mobile barcode scanner gun system or stand-alone mobile tablet into the fixed POS docking station. When no PC is connected to the Micro USB connector port J6 prior to docking the mobile barcode scanner gun system or stand-alone mobile tablet, the debug and diagnostics port will remain inactive.

The Serial Interface 406 consists of logic to connect the mobile barcode scanner gun system or stand-alone mobile tablet via the Custom Interface Cable connector J9 to an RS-232C Asynchronous serial port J7, which allows the mobile barcode scanner gun system or stand-alone mobile tablet to connect to RS-232C devices such as printers and modems, while residing in the fixed POS docking station.

Scan Switch Interface 407 provides a connection from the mobile barcode scanner gun system or stand-alone mobile tablet via the Custom Interface Cable connector J9 to a two wire switch interface connector J8, to which an external switch may be connected. This switch is operative to remotely engage the barcode scanner that is an integral part of the mobile barcode scanner gun system or stand-alone mobile tablet. The remote scan switch will typically be installed on the Base Housing Assembly, in a position easily accessible to the user.

Figure 7:
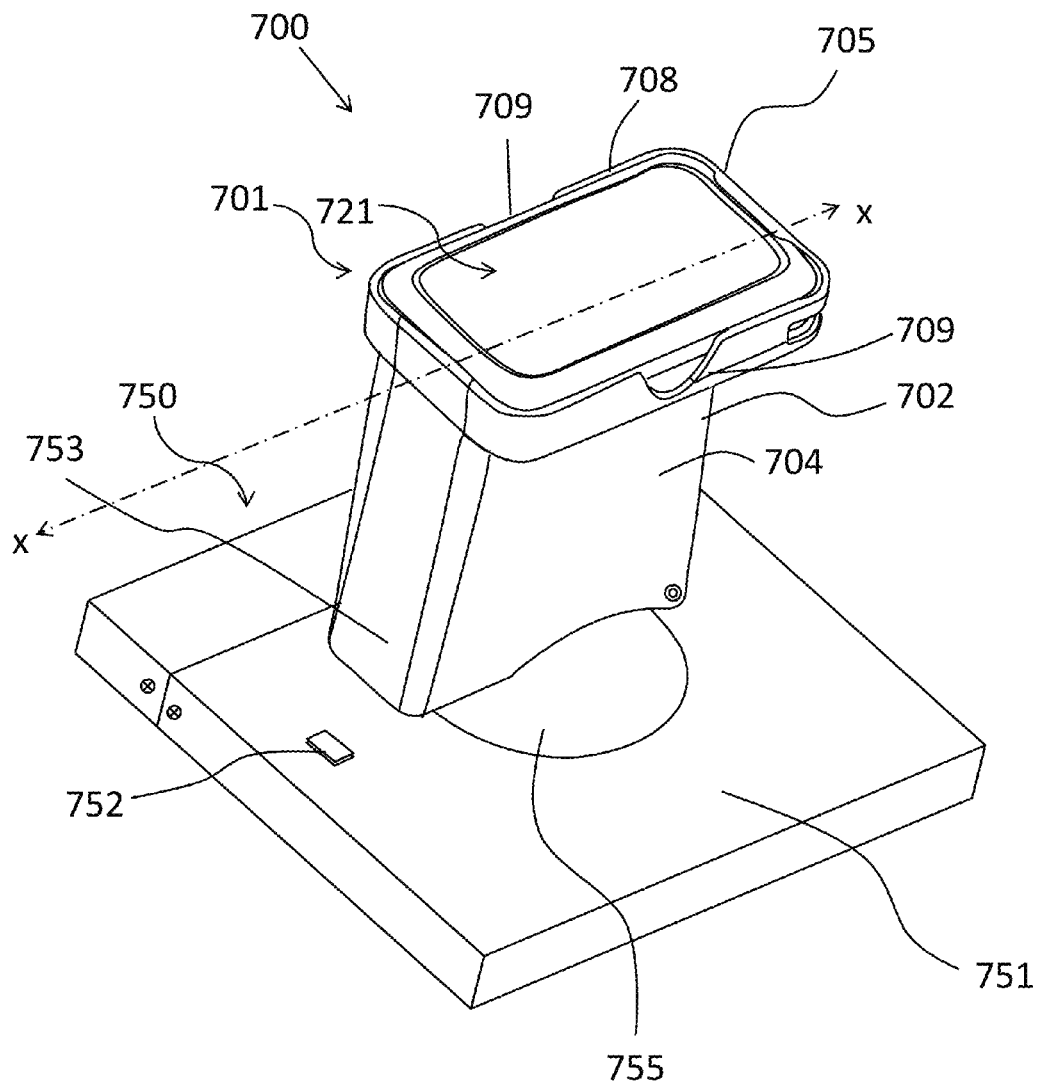
FIG. 7 is a top side view depicting an embodiment of the subject Tablet Gun or mobile tablet docked within the fixed POS docking station.
Figure 8:
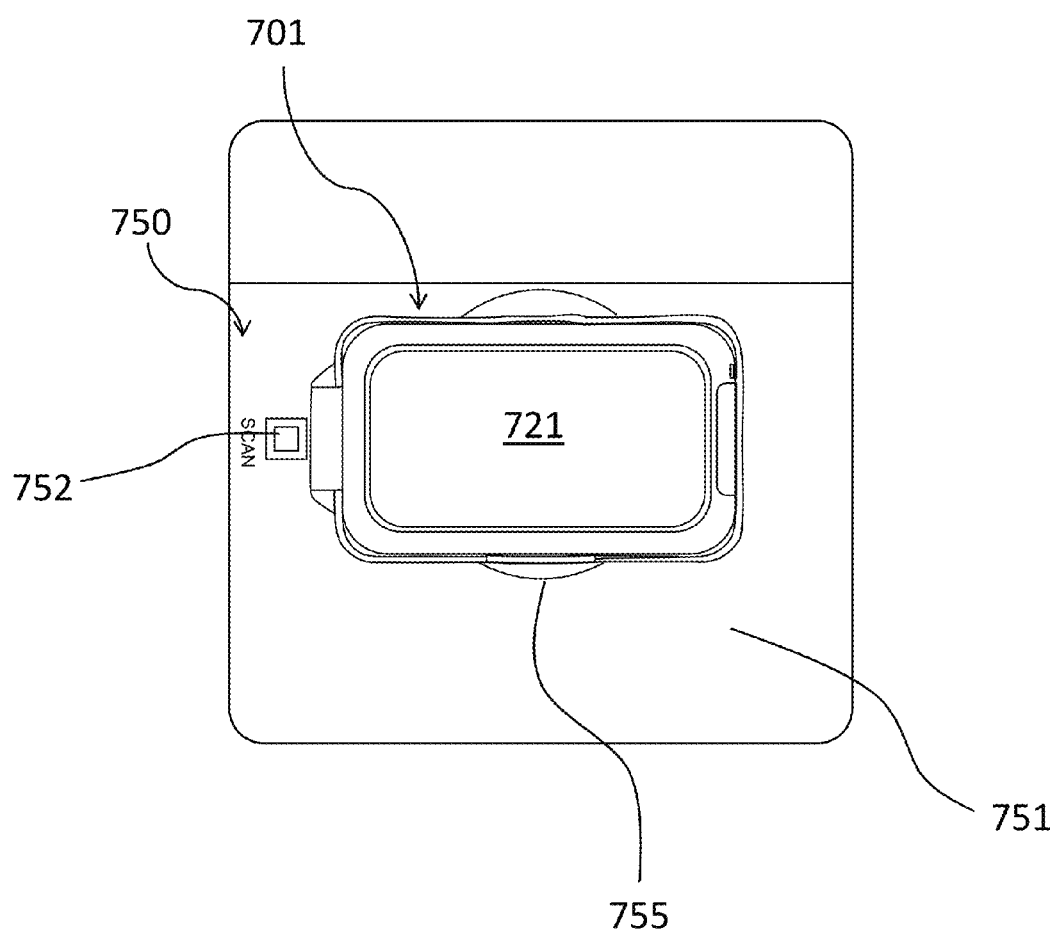
FIG. 8 is a top plan view depicting the Tablet Gun or mobile tablet docked within the fixed POS docking station of FIG. 7.
Figure 9:
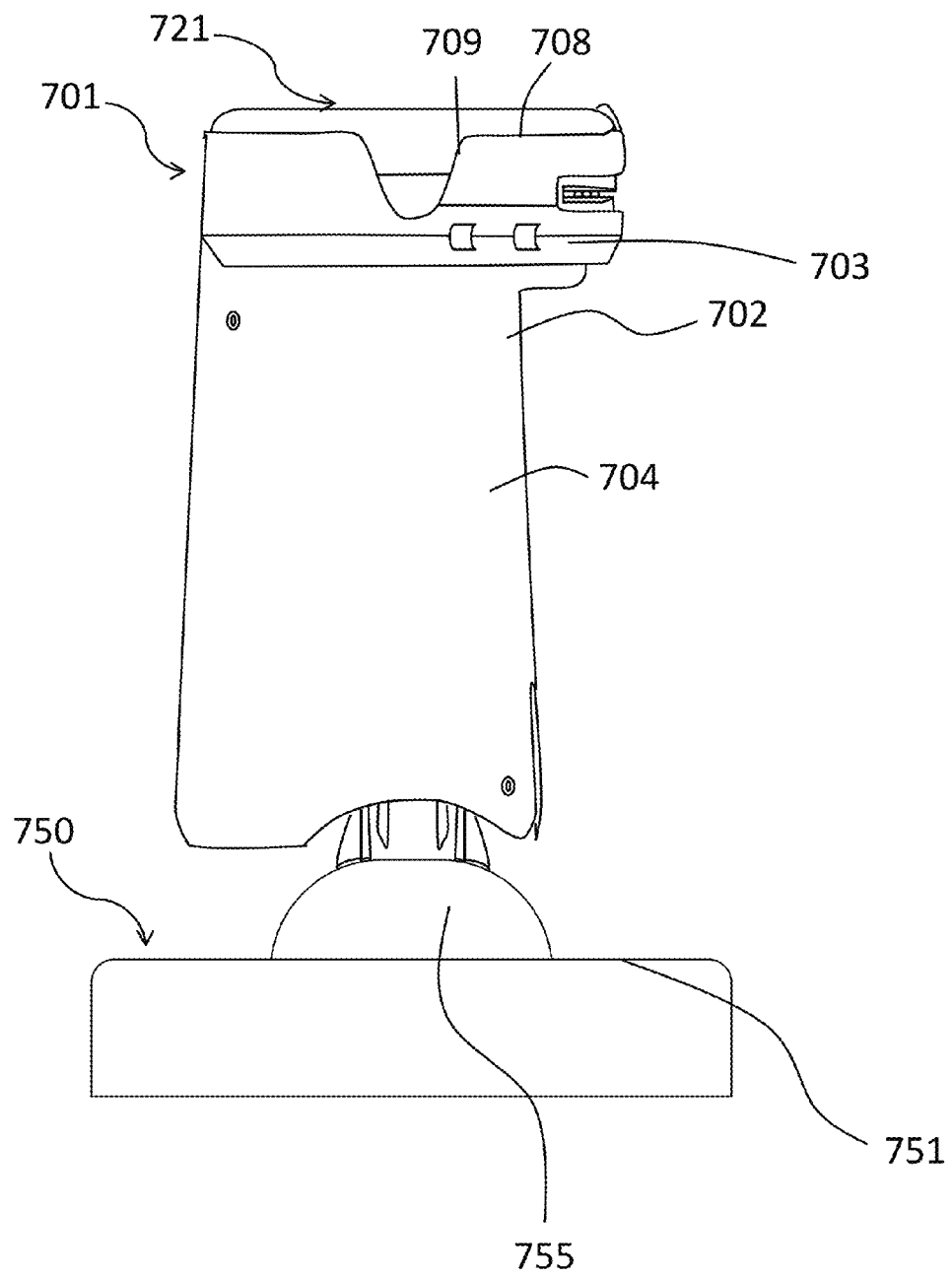
FIG. 9 is a first side view depicting the Tablet Gun or mobile tablet docked within the fixed POS docking station of FIG. 7.
Figure 10:
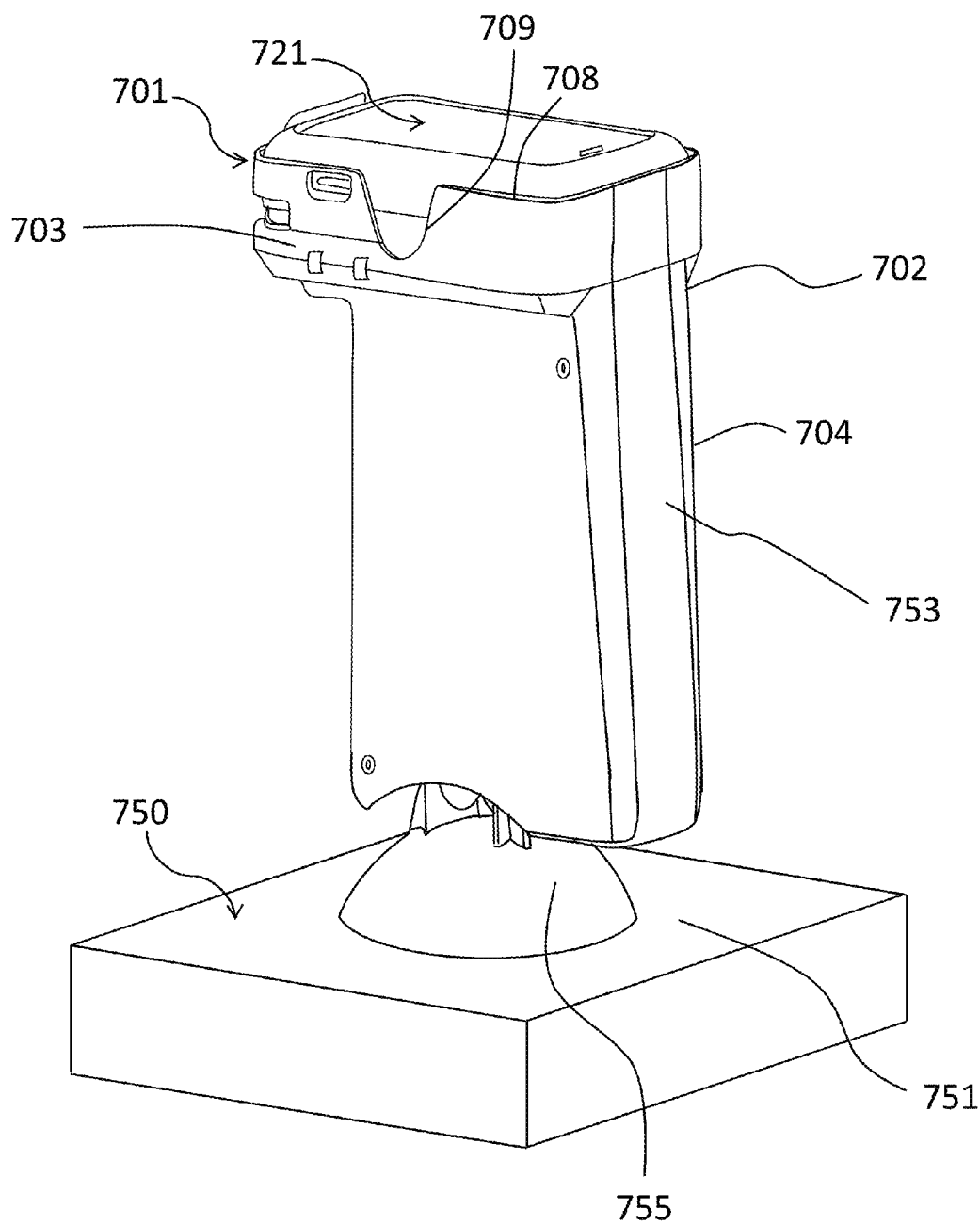
FIG. 10 is a second side view of the Tablet Gun or mobile tablet docked within the fixed POS docking station of FIG. 7.
Figure 11:
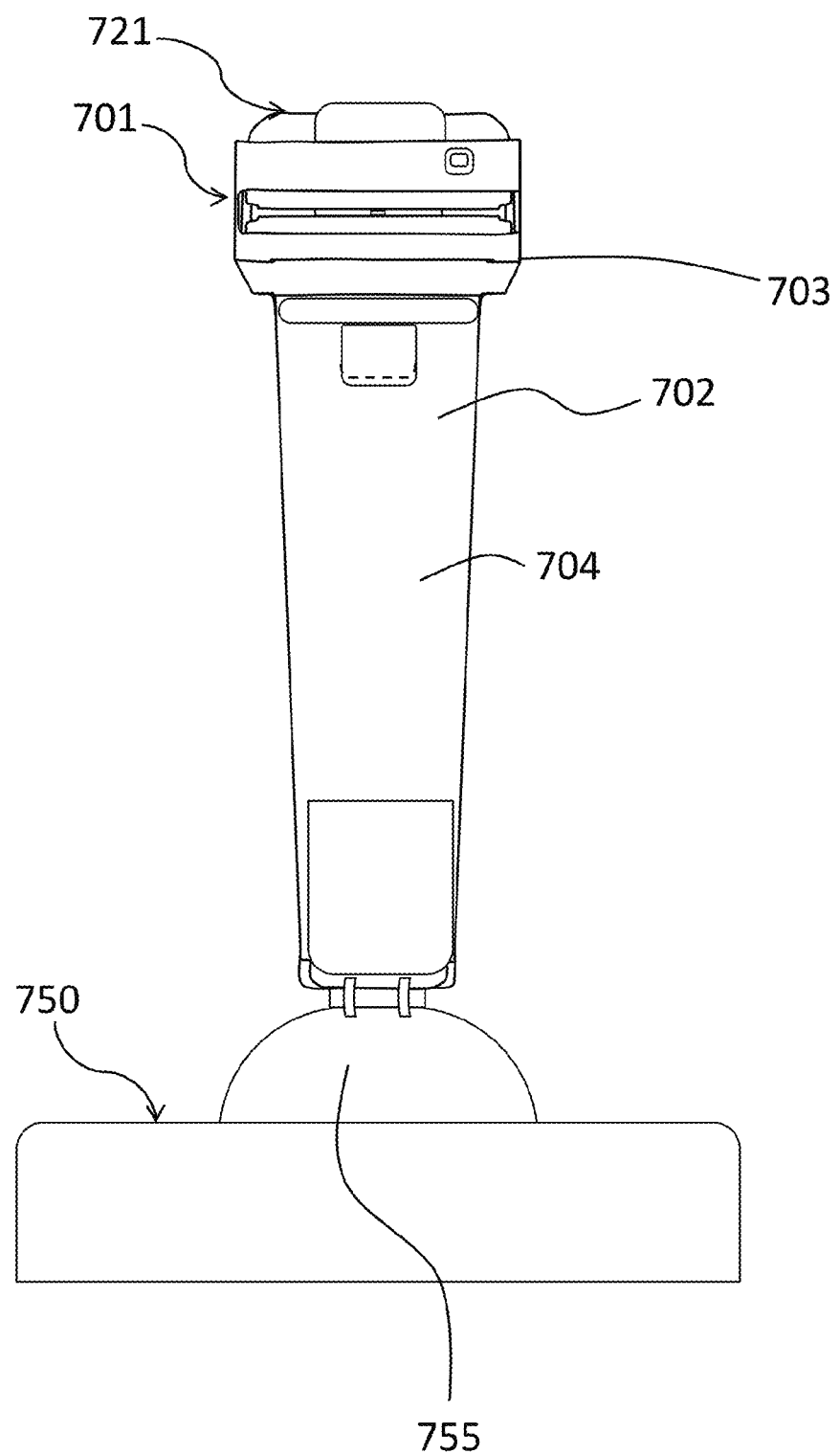
FIG. 11 is a front view of the Tablet Gun or mobile tablet fixed point of sale docking station of FIG. 7.
Figure 12:
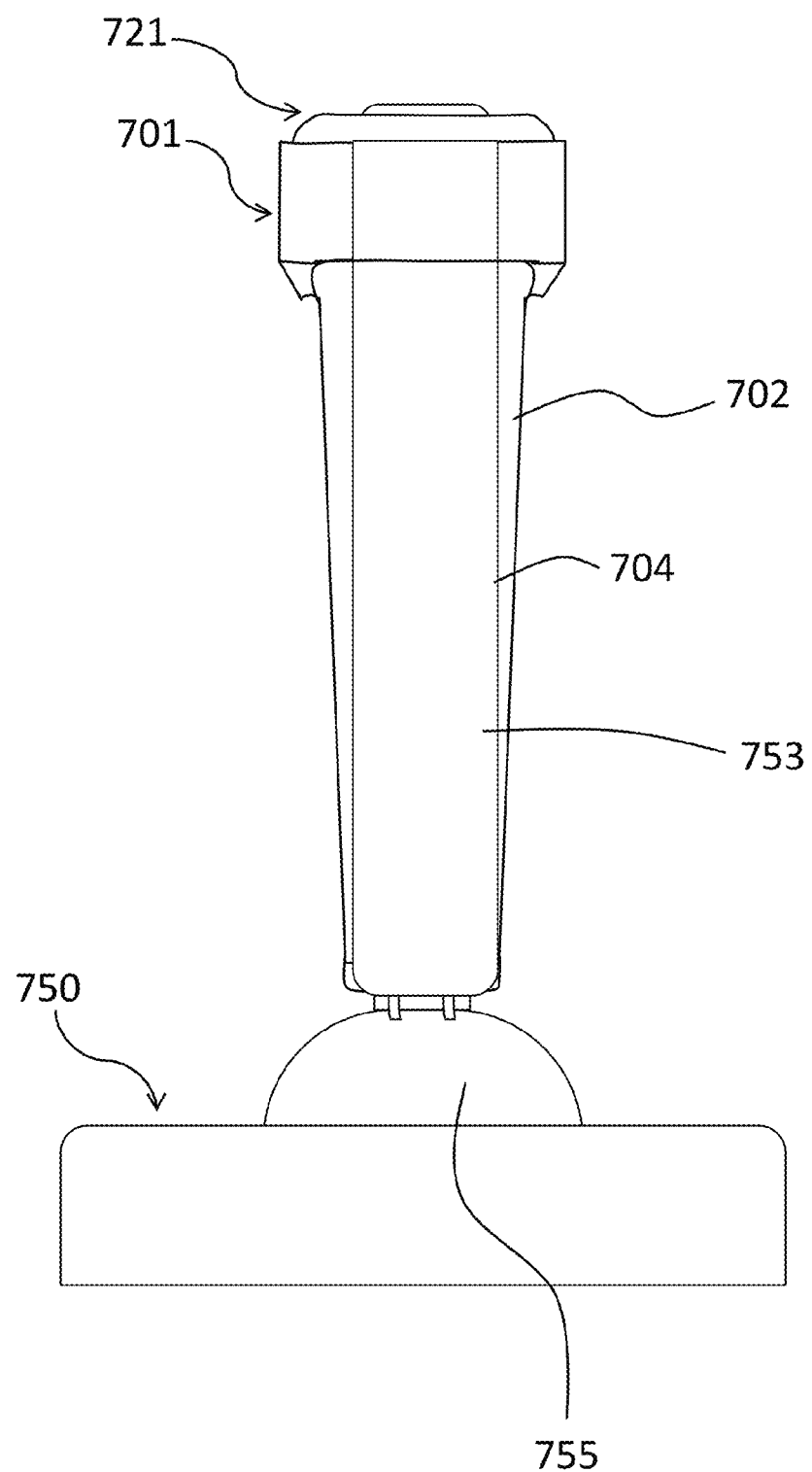
FIG. 12 is a back view of the Tablet Gun or mobile tablet docked within the fixed POS docking station of FIG. 7.
Figure 13:
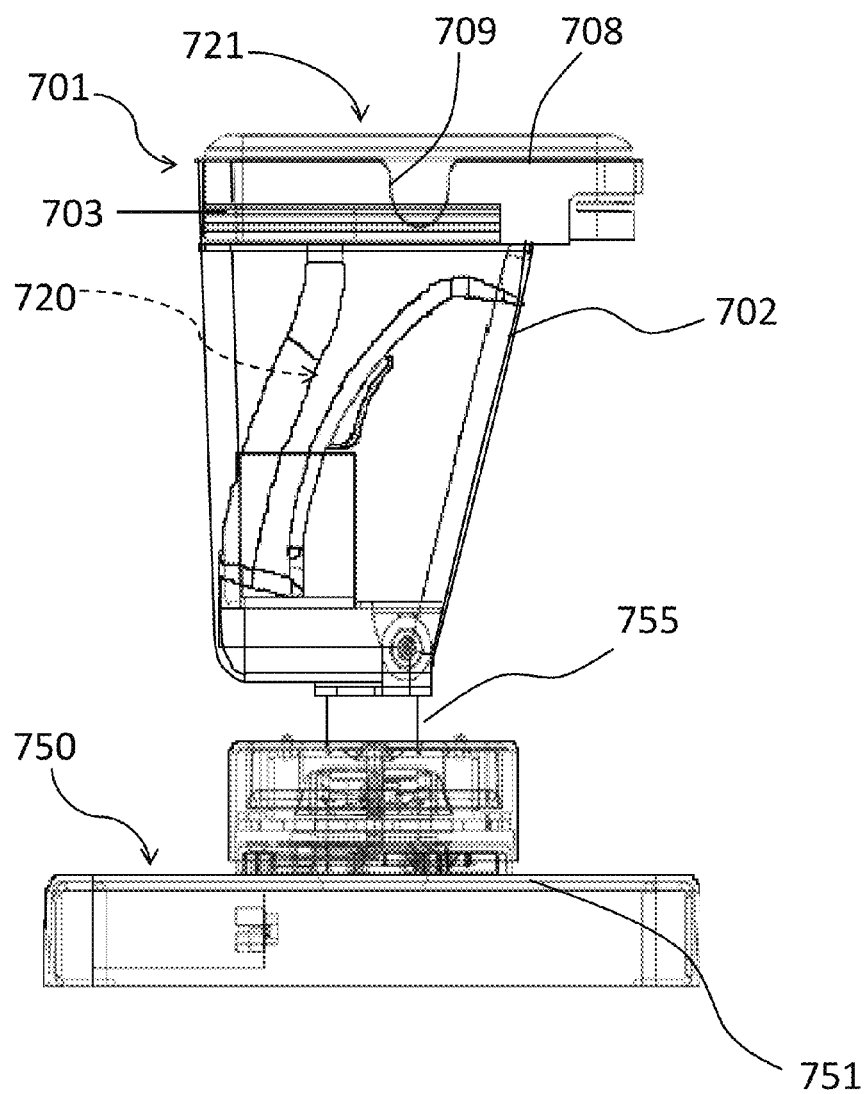
FIG. 13 is a cross-sectional view of the Tablet Gun or mobile tablet docked within the fixed POS docking station of FIG. 7, taken along line x-.

FIG. 7 shows a top side view of an embodiment of the subject Tablet Gun or mobile tablet docked within the fixed POS docking station. FIG. 8 shows a top plan view of the Tablet Gun or mobile tablet docked within the fixed POS docking station of FIG. 7. FIG. 9 shows a first side view of the Tablet Gun or mobile tablet docked within the fixed POS docking station of FIG. 7. FIG. 10 shows a second side view of the Tablet Gun or mobile tablet docked within the fixed POS docking station of FIG. 7. FIG. 11 shows a front view of the Tablet Gun or mobile tablet docked within the fixed POS docking station of FIG. 7. FIG. 12 shows a back view of the Tablet Gun or mobile tablet docked within the fixed POS docking station of FIG. 7. FIG. 13 shows a cross-sectional view of the Tablet Gun or mobile tablet docked within the fixed POS docking station of FIG. 7, taken along line x-x.

Referring to FIGS. 7-13, the fixed POS docking station 700 for a mobile scanner gun system with mobile tablet device having an upper receiver for processing a retail store POS sales transactions has an upper housing assembly 701 adapted to house a mobile barcode scanner gun system 720 (FIG. 13) with a table 721, as shown, in a "cradle fashion". A tablet cradle enclosure 702 is provided having a base 703 in a top frame 705 with a body 704 and designed to receive and fit snuggly around the mobile barcode scanner gun system 720 with mobile tablet device 721 providing stability and a look of integration. Preferably, the top frame 705 includes two finger slot recessions 709 on each side of a long edge 708 of the upper housing assembly 701 to provide quick and easy removal of the mobile barcode scanner gun system 720 with mobile tablet device 721. Two electrical (spring loaded) pogo pin connectors having a housing integrated with a secondary printed circuit board (PCB1), located within the base of the tablet cradle enclosure [see FIG. 19].

A base housing assembly 750 is provided comprising a top portion 751 with an integrated scanner activation button 752 for use with a barcode scanner integrated with the mobile barcode scanner gun system with mobile tablet device when docked in the fixed POS docking station. A base mounting plate 752 is provided, adapted for attachment to an under cabinet mounting system to provide security and stability to the fixed POS docking station. Preferably the base housing assembly further comprises a detachable rear port cover 753 for access within the housing. A primary printed circuit board (PCB2) located on the base mounting plate operates with at least one USB, Ethernet, debugging Serial ports, scan switch interface and an external power supply port [see FIG. 19]. The top portion 751 further includes a tilting and rotational mechanism 755 that connects the base housing assembly 750 to the upper housing assembly 701. The tilting mechanism and rotational mechanism is adapted to allow the upper housing assembly to rotate and tilt "toward" or "away" from a user throughout its rotation allowing the user proper viewing orientation of the fixed POS docking station from any position. The secondary printed circuit board (PCB1) is connected to the primary printed circuit board (PCB2) through a custom interface cable operable to facilitate electrical communication between the fixed POS docking station and the mobile barcode scanner gun system with mobile tablet device. USB, Ethernet, debugging Serial ports, scan switch interface and power supply port housed within the base housing assembly are fully operable with the mobile barcode scanner gun system with mobile tablet device and can be connected to a variety of POS peripheral devices and other store systems peripheral devices.

The Upper Housing Assembly further preferably includes an extended table top/table top extension 706 extending from and surrounding the tablet cradle enclosure 702. The extended table top 706 extends flush from the top frame/bracket 705 of the table cradle enclosure 702. It is adapted to provide additional hand support and comfort for a user and a more thorough look of integration. Preferably, the table top extension 706 completely surrounds a top bracket/frame 705 of the tablet cradle enclosure. As constructed, the table top extension 706 provides an enhanced surface area for the user to rest his/her hands and to provide for an ergonomically constructed device. Preferably, the table top extension 706 has a length ranging from one inch to six inches.

Figure 14:
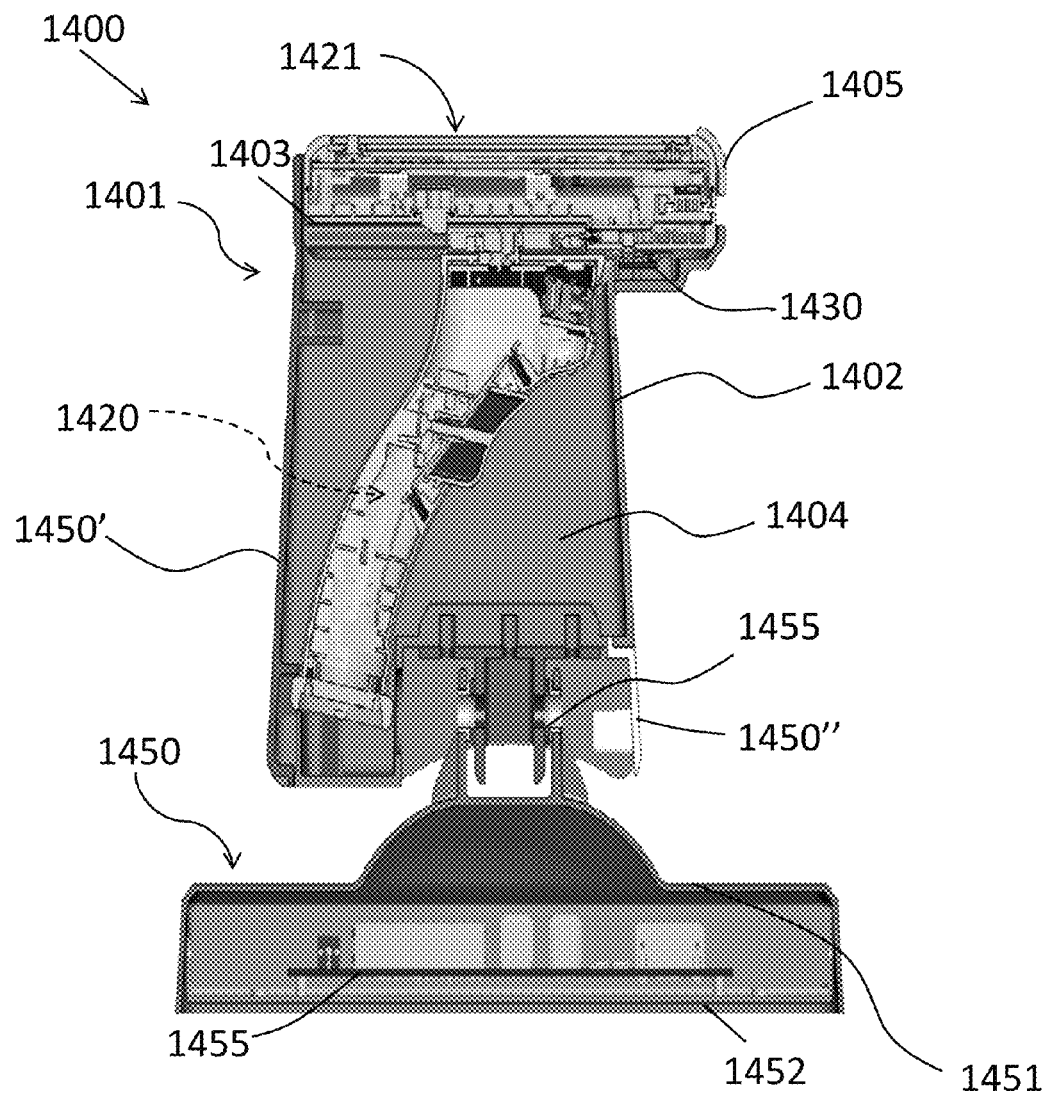
FIG. 14 is a cross-sectional view depicting an alternative embodiment of the internal functions of the Tablet Gun or mobile tablet docked within the fixed POS docking station of FIG. 7, taken along line x-x.

FIG. 14 shows a cross-sectional view of an alternative embodiment of the internal functions of the Tablet Gun or mobile tablet or mobile tablet docked within the fixed POS docking station of FIG. 7, taken along line x-x, shown generally at 1400. An Upper Housing Assembly 1401 is provided to house a mobile barcode scanner gun system 1420 with a table 1421. A tablet cradle enclosure 1402 is provided with a base 1403 having a body 1404 and a top frame 1405 designed to receive and fit snuggly around the mobile barcode scanner gun system 1420 with mobile tablet device 1421, providing stability and a look of integration. Two electrical (spring loaded) pogo pin connectors 1430 having a housing integrated with a secondary printed circuit board (PCB1) are located within the base of the tablet cradle enclosure 1402. A base housing assembly 1450 comprises a top portion 1451 and a base mounting plate 1452. Base housing assembly 1450 includes left 1450' and right 1450" covers (see FIG. 15 for view of covers). A primary printed circuit board (PCB2) 1455 is located on the base mounting plate 1452 operable with at least one USB, Ethernet, debugging Serial ports, scan switch interface and an external power supply port. The top portion 1451 further includes a tilting and rotational mechanism 1455 that connects the base housing assembly 1450 to the upper housing assembly 1401.

Figure 15:
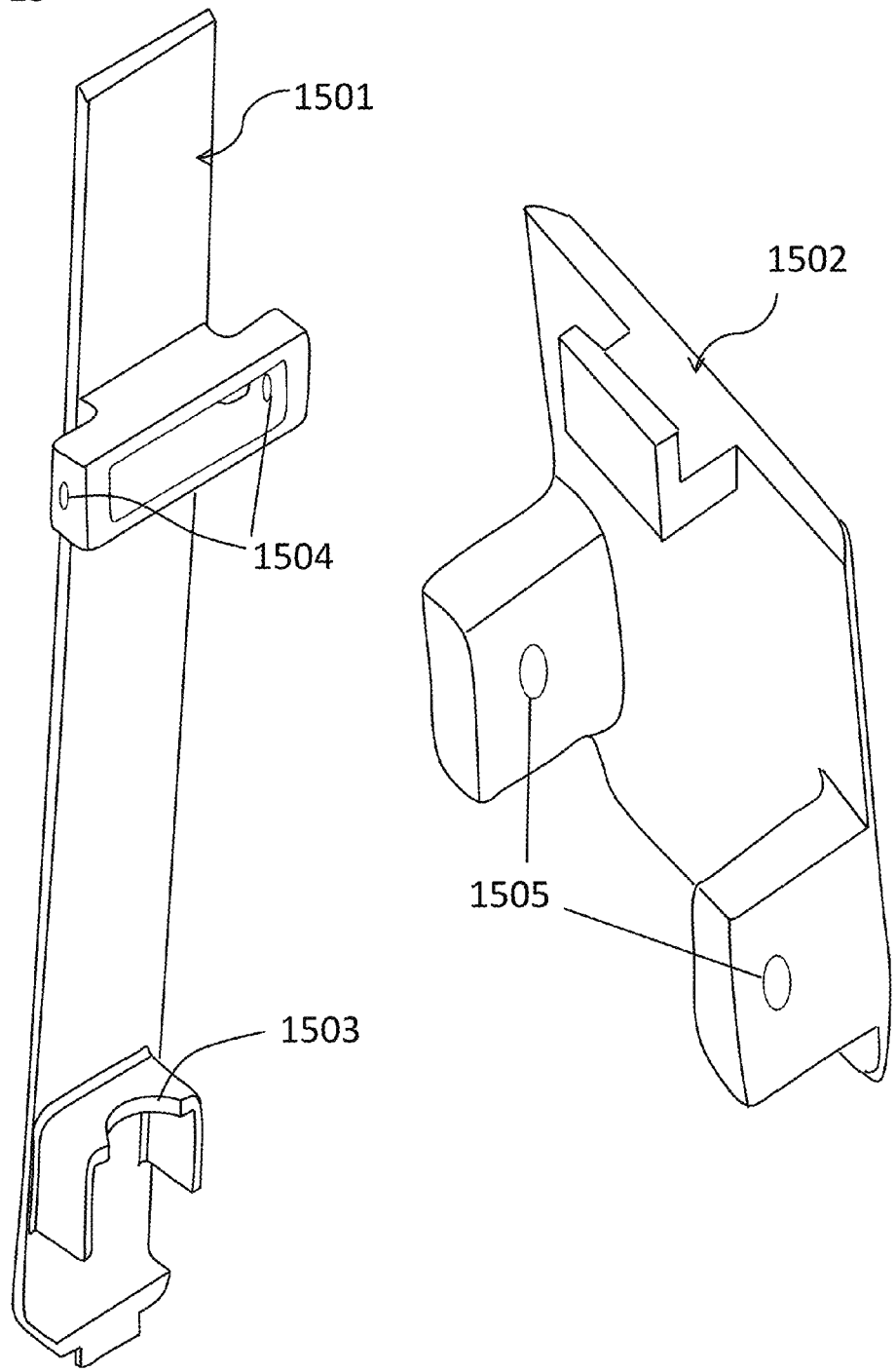
FIG. 15 depicts an embodiment of the left and right covers of the device of FIG. 7.

FIG. 15 shows an embodiment of the left 1501 and right 1502 covers of the device of FIG. 7. Left cover 1501 includes a Locks Pistol Grip 1503 that Prevents Removal of the Tablet, and hard attachment points 1504. Right cover 1502 includes hard attachment points 1505.

Figure 16:
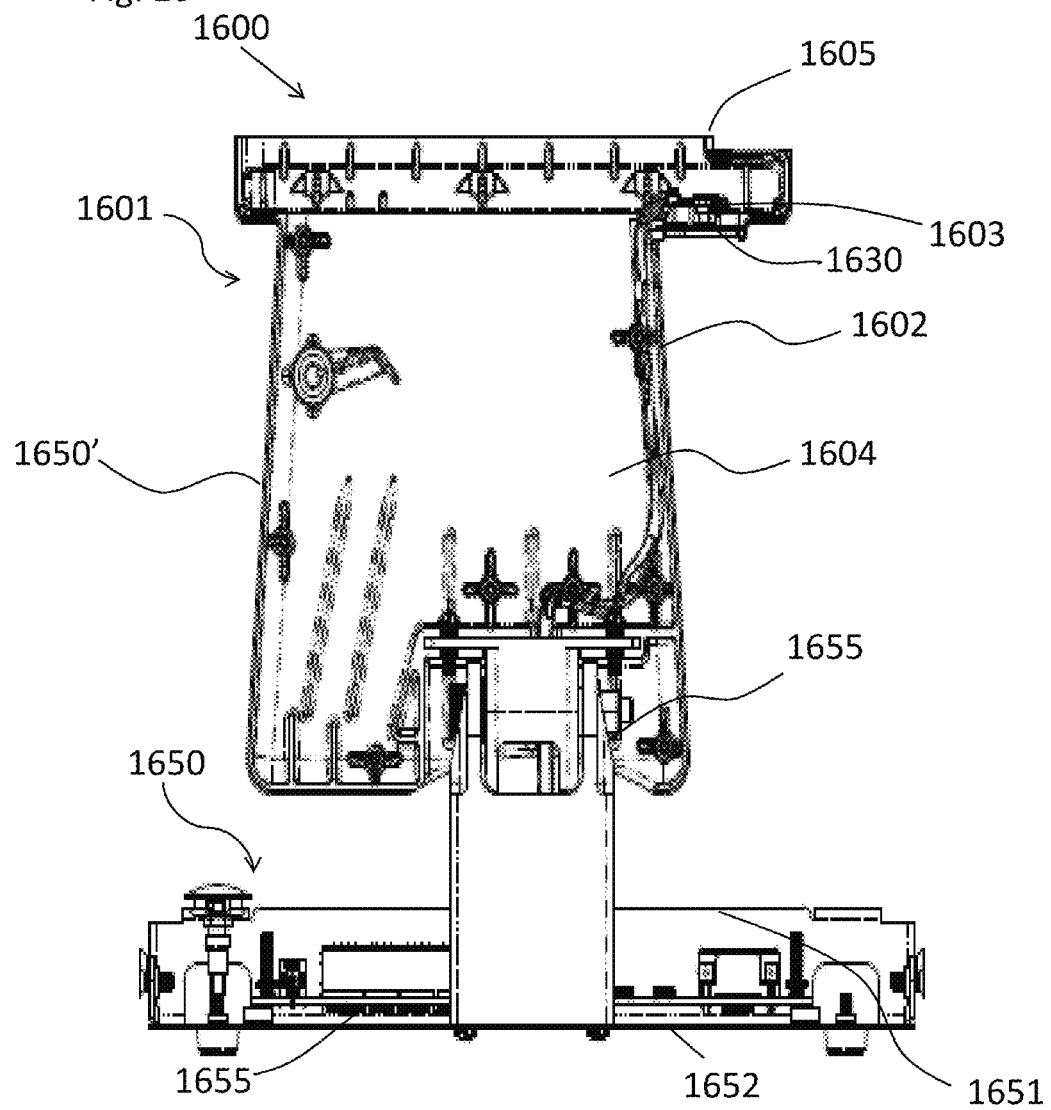
FIG. 16 is a cross-sectional side view of an embodiment of the subject Tablet Gun or mobile tablet docked within the fixed POS docking station.
Figure 17:
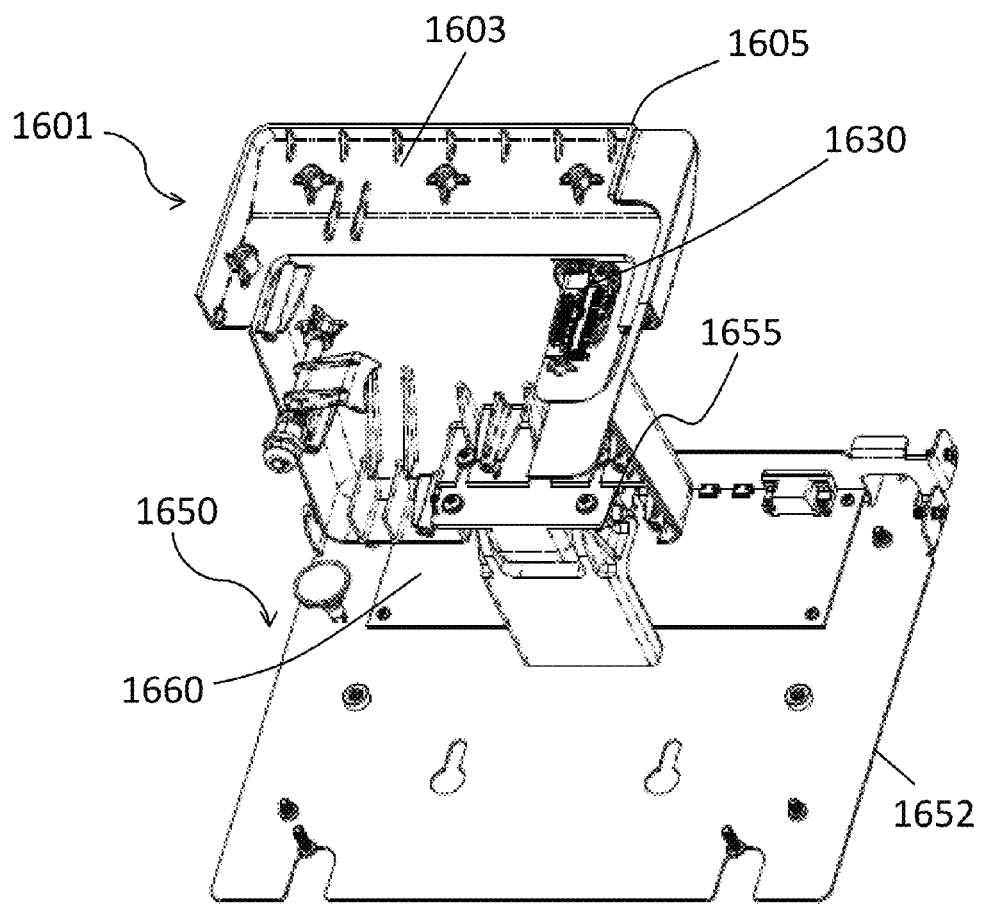
FIG. 17 shows a view of the fixed POS docking station of FIG. 16 with the top covering removed.
Figure 18:
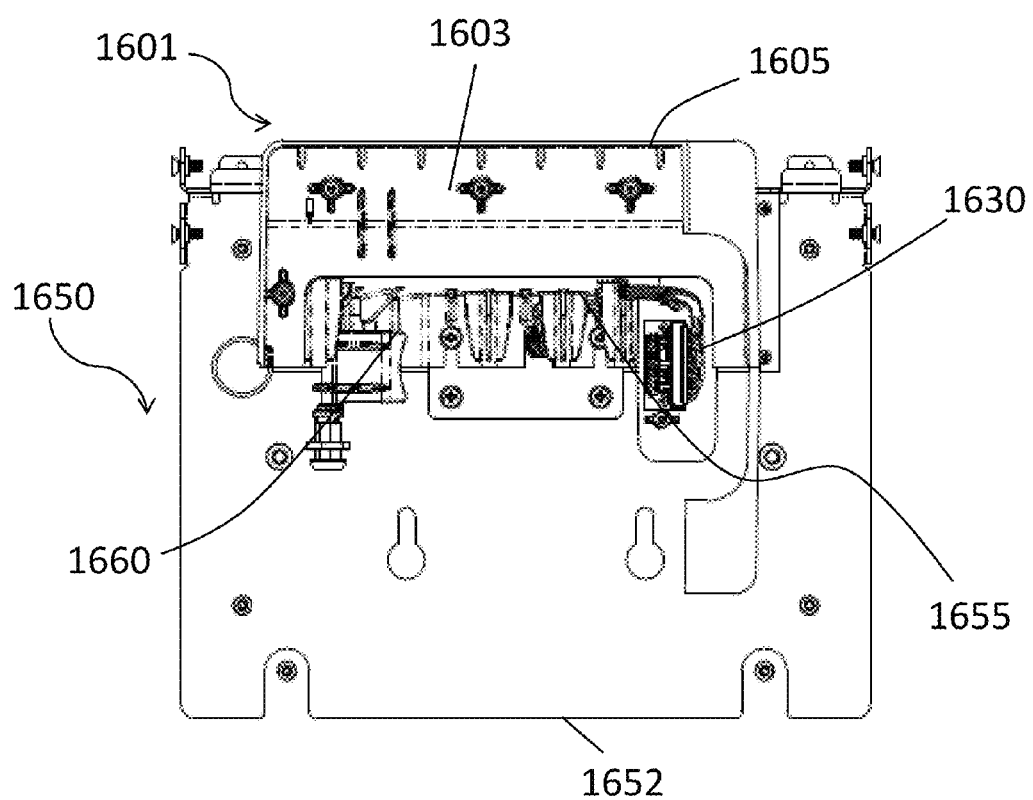
FIG. 18 is a top plan view of the fixed POS docking station of FIG. 17.
Figure 19:
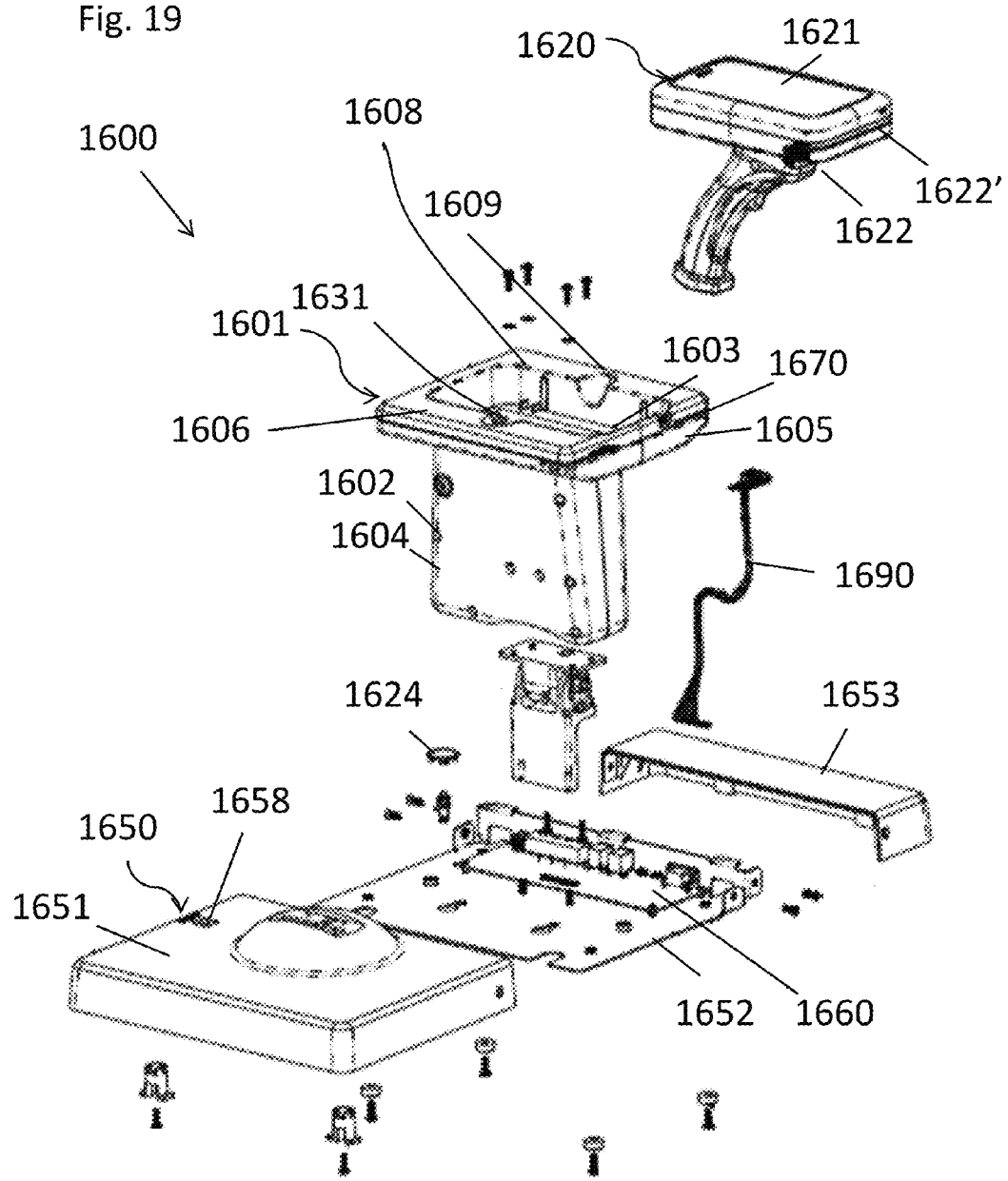
FIG. 19 is a top plan view of each of the components of the fixed POS docking station device of FIG. 16 as it is being assembled.

FIG. 16 shows a cross-sectional side view of an embodiment of the subject Tablet Gun or mobile tablet docked within the fixed POS docking station. FIG. 17 shows a view of the fixed POS docking station of FIG. 16 with the top covering removed. FIG. 18 shows a top plan view of the FIG. 17. FIG. 19 shows a top plan view of each of the components of the docking station device of FIG. 16 as it is being assembled.

Referring to FIGS. 16-19, the fixed POS docking station 1600 is adapted to receive a mobile scanner gun system with mobile tablet device 1620 (or stand-alone mobile tablet) having an upper receiver 1622 for processing a retail store POS sales transaction. The fixed POS docking station 1600 has an Upper Housing assembly 1601 constructed having a tablet cradle enclosure 1602 with a base 1603 with a body 1604 and a top frame 1605 designed to receive and fit snuggly around the mobile barcode scanner gun system with mobile tablet device 1621. Preferably, the top frame 1605 includes two finger slot recessions 1609 on each side of a long edge 1608 of the upper housing assembly 1601 to provide quick and easy removal of the mobile barcode scanner gun system with mobile tablet device 1621. Two electrical (spring loaded) pogo pin connectors having a housing 1631 is integrated with a secondary printed circuit board (PCB1) 1631, located within the base 1603 of the tablet cradle enclosure 1602. Preferably the two electrical (spring loaded) pogo pin connectors housing 1631 are ten (10) pin electrical (spring loaded) pogo pin connectors.

Four magnets are preferably integrated generally on each corner on the bottom of the Upper Housing Assembly, with corresponding magnetic slugs installed in matching locations on the underside of the Upper Receiver of the mobile barcode scanner gun system or stand-alone mobile tablet 1621. The Upper Housing Assembly preferably further comprises two payment processing slots 1670 adapted to align a magnetic stripe reader (MSR) 1622' on the mobile barcode scanner gun system or stand-alone mobile tablet 1621 to operate while docked in the fixed POS docking station. These components are adapted to allow a payment card to pass through the MSR or dipped into the EMV reader installed within the mobile barcode scanner gun system or stand-alone mobile tablet without restriction. Preferably, the Upper Housing Assembly further comprises a barcode scanner opening (button actuator shown at 1624, FIG. 19) adapted to align with a barcode scanner installed on the mobile barcode scanner gun system 1620 tablet 1621/or stand-alone mobile tablet to properly operate the barcode scanner while the mobile barcode scanner gun system or stand-alone mobile tablet is docked in the fixed POS docking station through use of the barcode scanner switch located on the base housing assembly.

A base housing assembly 1650 comprises a top portion 1651 with an integrated scanner activation button 1685 for use with a barcode scanner integrated with the mobile barcode scanner gun system with mobile tablet device when docked in the fixed POS docking station. A base mounting plate 1652 is adapted for attachment to an under cabinet mounting system to provide security and stability to the fixed POS docking station. Preferably the Base Housing Assembly further comprises a detachable rear port cover 1653 for access within the housing. A primary printed circuit board (PCB2) 1660 is located on the base mounting plate operable with at least one USB, Ethernet, debugging Serial ports, scan switch interface and an external power supply port. The top portion 1651 further includes a tilting and rotational mechanism 1655 that connects the base housing assembly 1650 to the upper housing assembly 1601. Wiring harness 1690 is provided.

The Upper Housing Assembly further preferably includes an extended table top/table top extension 1606 extending from and surrounding the tablet cradle enclosure 1602. The extended table top 1606 extends flush from the top frame/bracket 1605 of the table cradle enclosure 1602. It is adapted to provide additional hand support and comfort for a user and a more thorough look of integration. Preferably, the table top extension 1606 completely surrounds a top bracket/frame 1605 of the tablet cradle enclosure. As constructed, the table top extension 1606 provides an enhanced surface area for the user to rest his/her hands, and provides an ergonomically constructed device. Preferably, the table top extension 1606 has a length ranging from one inch to six inches.

Figure 20:
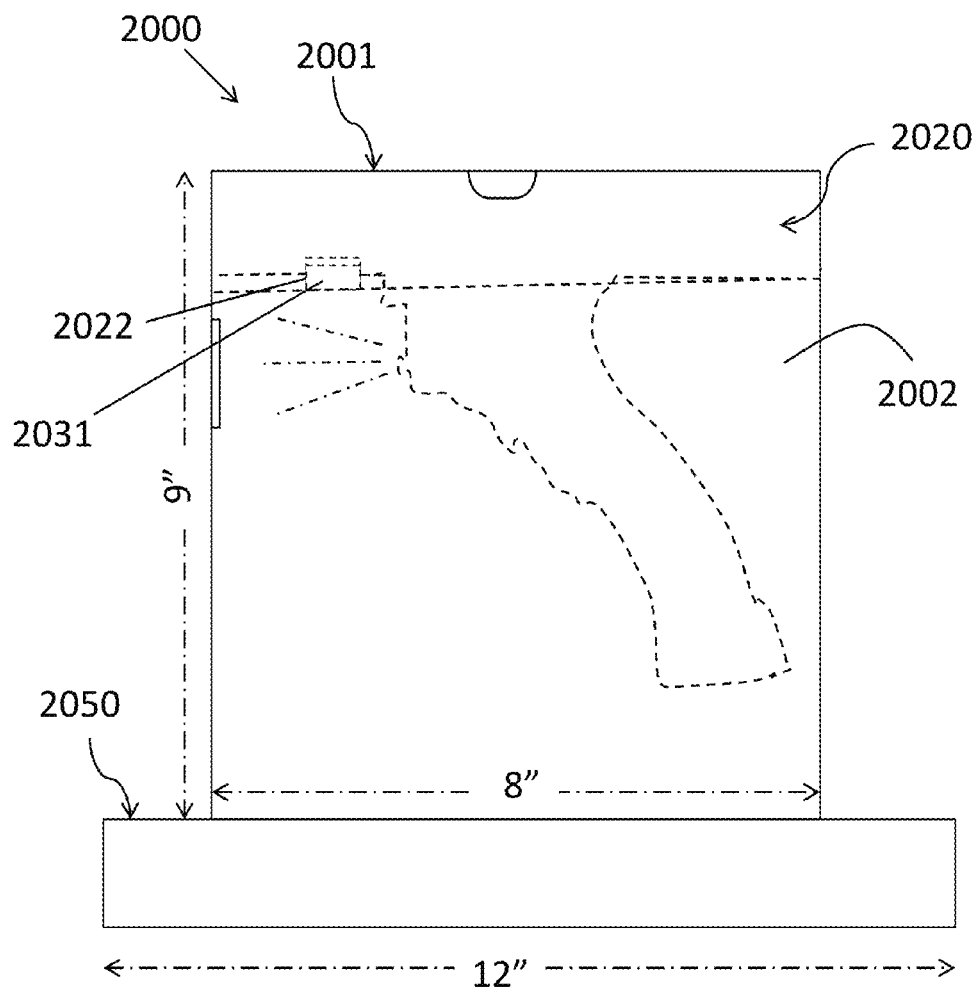
FIG. 20 is a side plan view of an embodiment of the fixed POS docking station device.
Figure 21:
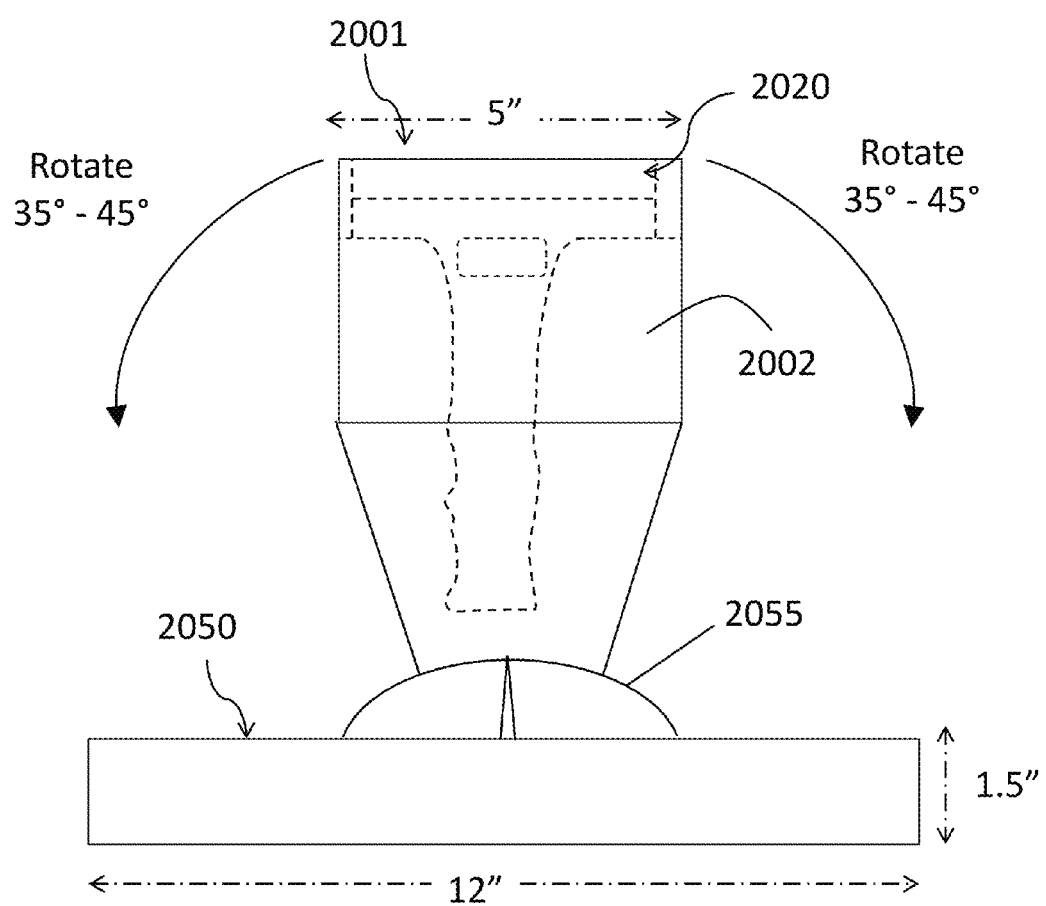
FIG. 21 is a front plan view of an embodiment of the fixed POS docking station device.

FIG. 20 shows a side plan view of an embodiment of the fixed POS docking station. FIG. 21 shows a front plan view of an embodiment of the fixed POS docking station of FIG. 20. Referring to FIGS. 20-21, the fixed POS docking station 2000 is adapted to receive a mobile scanner gun system with mobile tablet device 2020 (or stand-alone mobile tablet) having an upper receiver 2022 for processing a retail store POS sales transaction. The fixed POS docking station 2000 has an upper housing assembly 2001 constructed having a tablet cradle enclosure 2002. Two electrical (spring loaded) pogo pin connectors having a housing 2031 are integrated with a secondary printed circuit board (PCB1). A base housing assembly 2050 includes a tilting and rotational mechanism 2055 that connects the base housing assembly 2050 to the upper housing assembly 2001.

Figure 22:
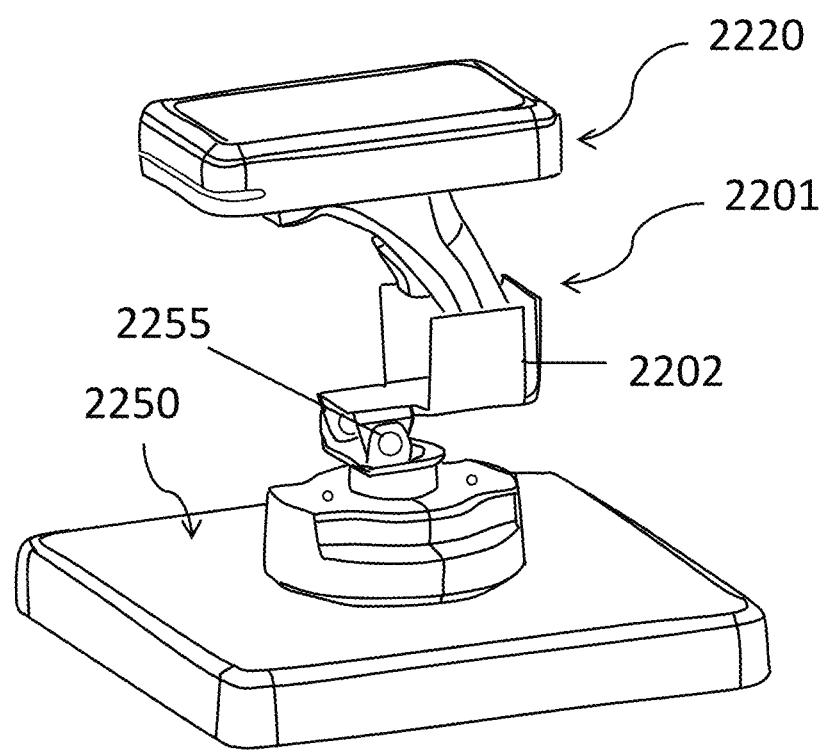
FIG. 22 is a top plan view of an embodiment of the fixed POS docking station device wherein no case is provided.

FIG. 22 shows a top plan view of an embodiment of the fixed POS docking station device wherein no case is provided. In this embodiment, the fixed POS docking station is adapted to receive a mobile scanner gun system 2220 with mobile tablet device as described herein. The fixed POS docking station has an upper housing assembly 2201 constructed having a tablet cradle enclosure 2202. A base housing assembly 2250 includes a tilting and rotational mechanism 2255 that connects the base housing assembly 2250 to the upper housing assembly 2201.

Figure 23:
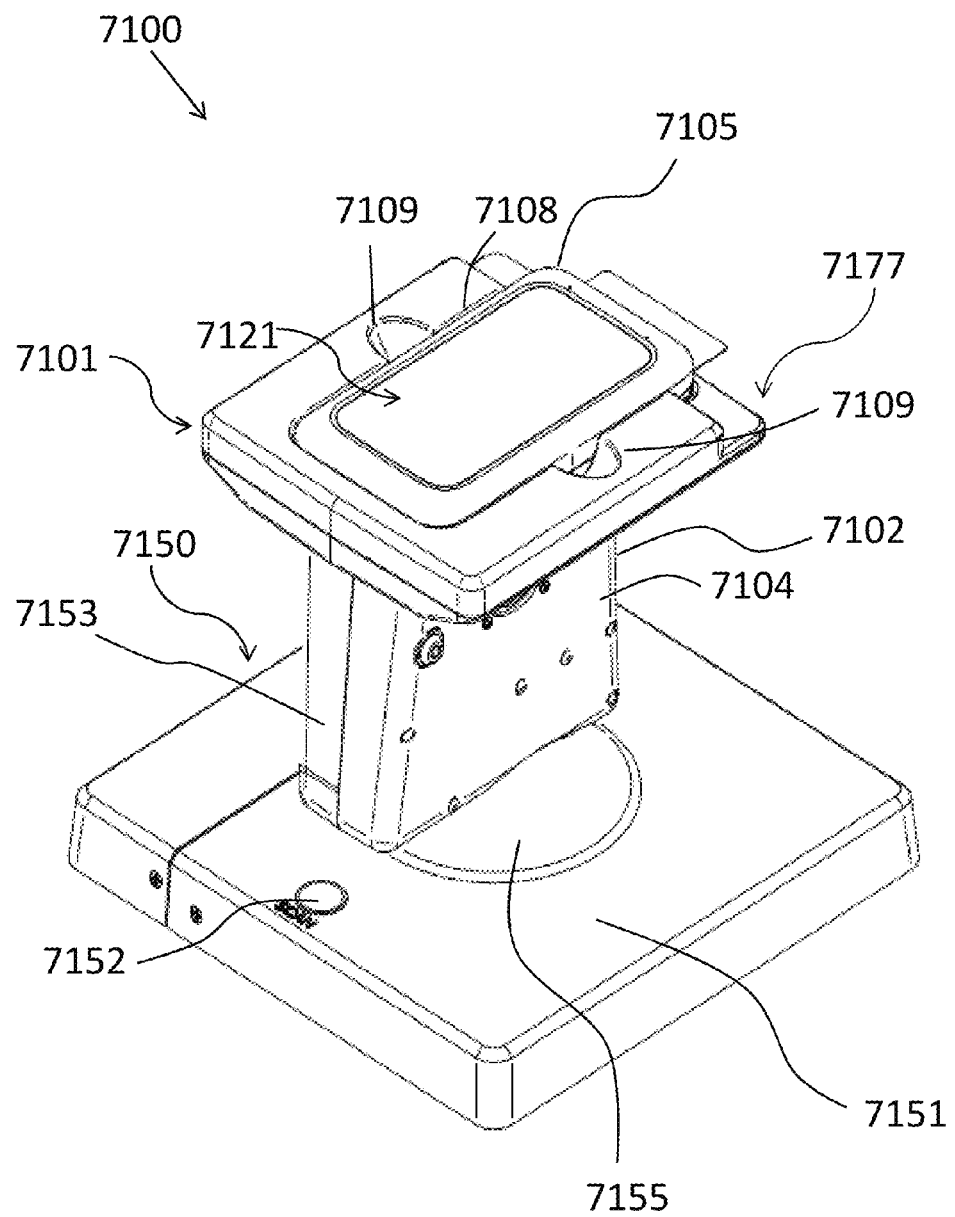
FIG. 23 is a top side view depicting an embodiment of the subject Tablet Gun or mobile tablet docked within the fixed POS docking station.
Figure 24:
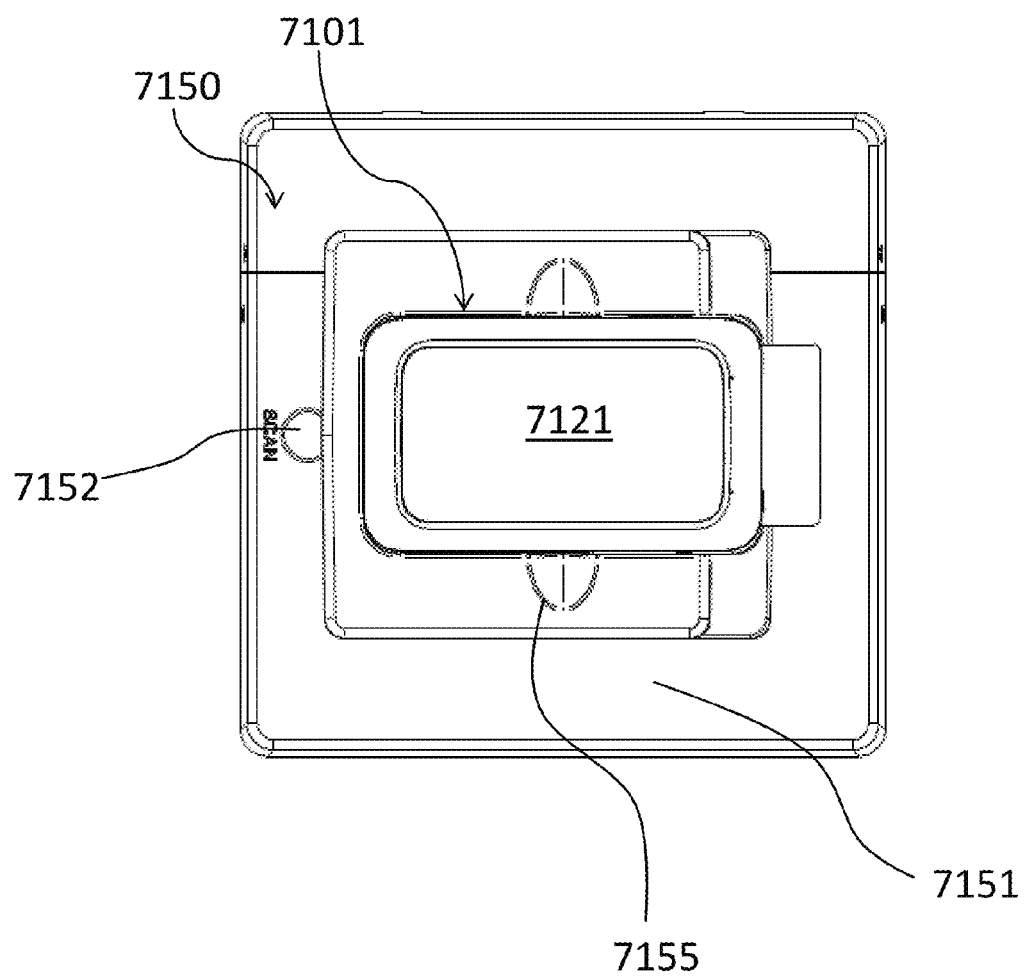
FIG. 24 is a top plan view depicting the Tablet Gun or mobile tablet docked within the fixed POS docking station of FIG. 23.
Figure 25:
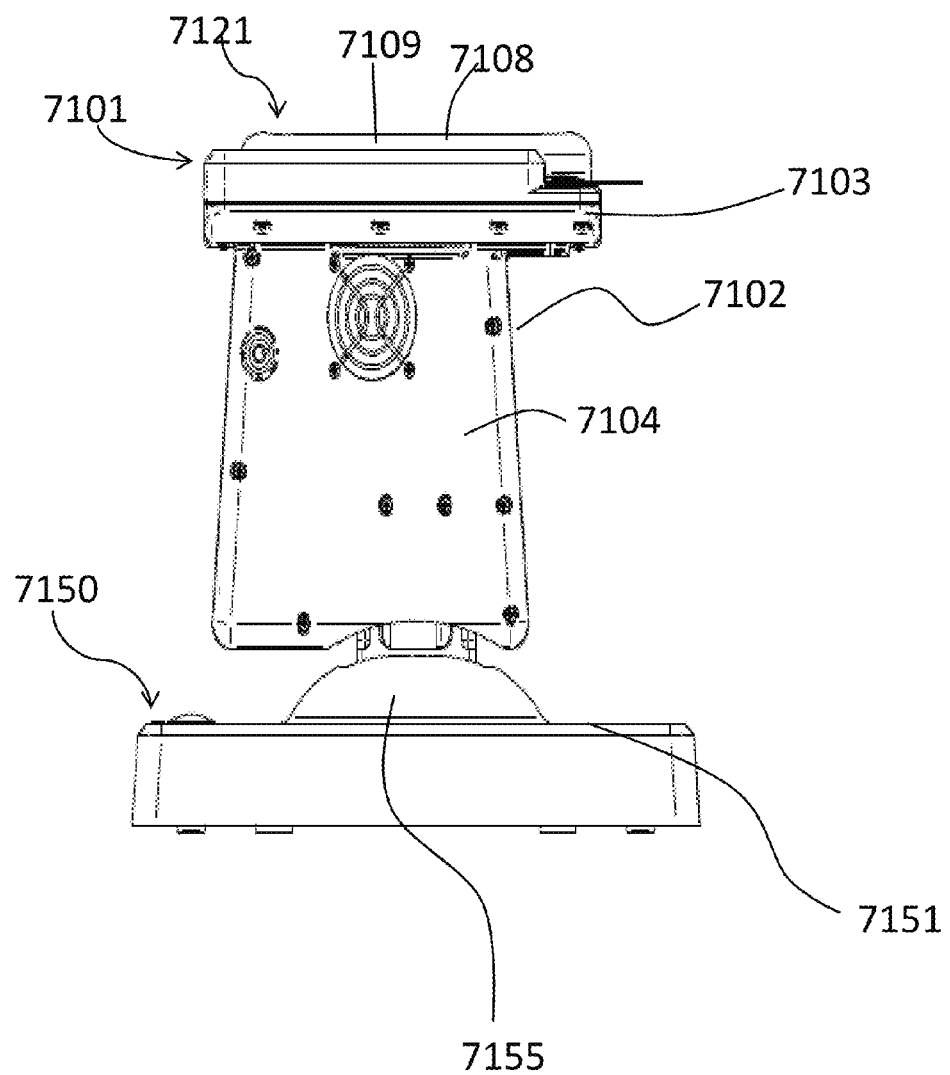
FIG. 25 is a first side view depicting the Tablet Gun or mobile tablet docked within the fixed POS docking station of FIG. 23.
Figure 26:
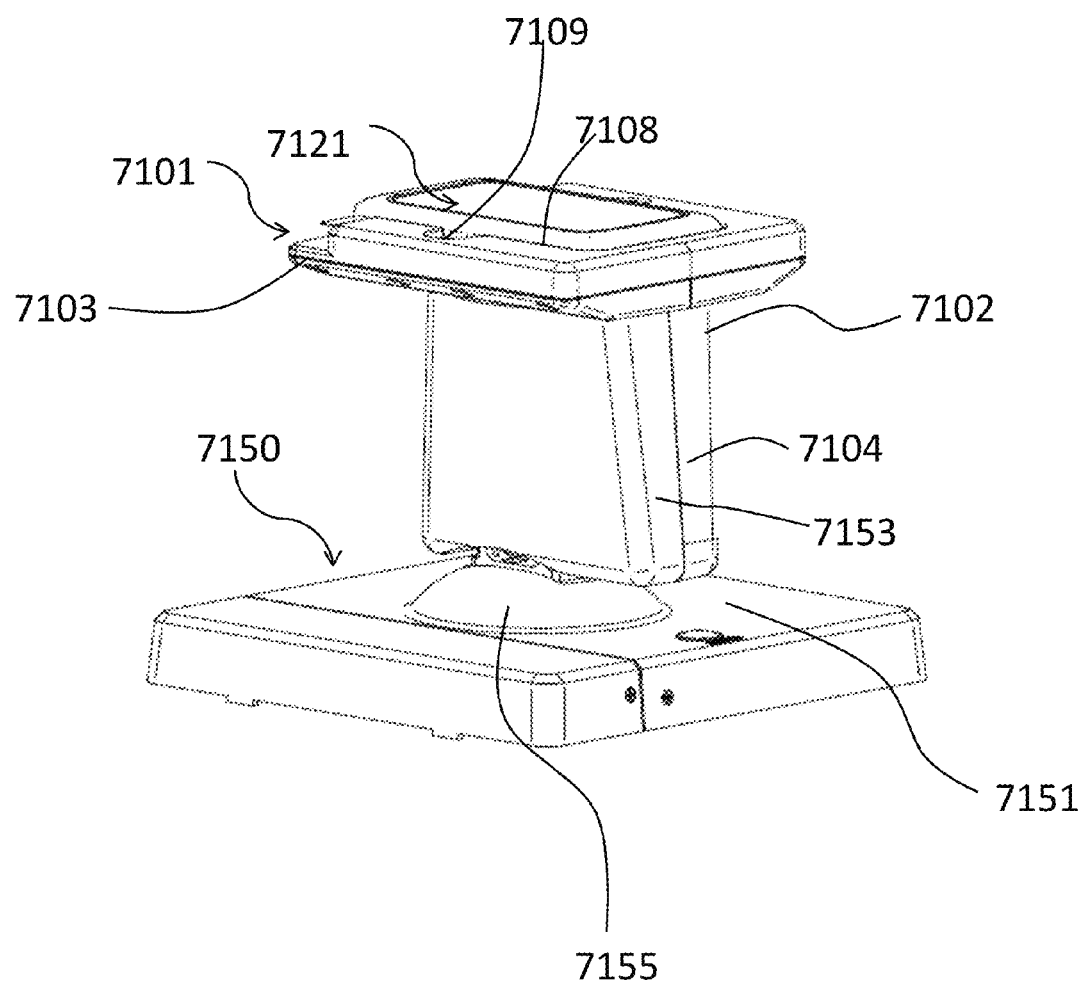
FIG. 26 is a second side view of the Tablet Gun or mobile tablet docked within the fixed POS docking station of FIG. 23.
Figure 27:
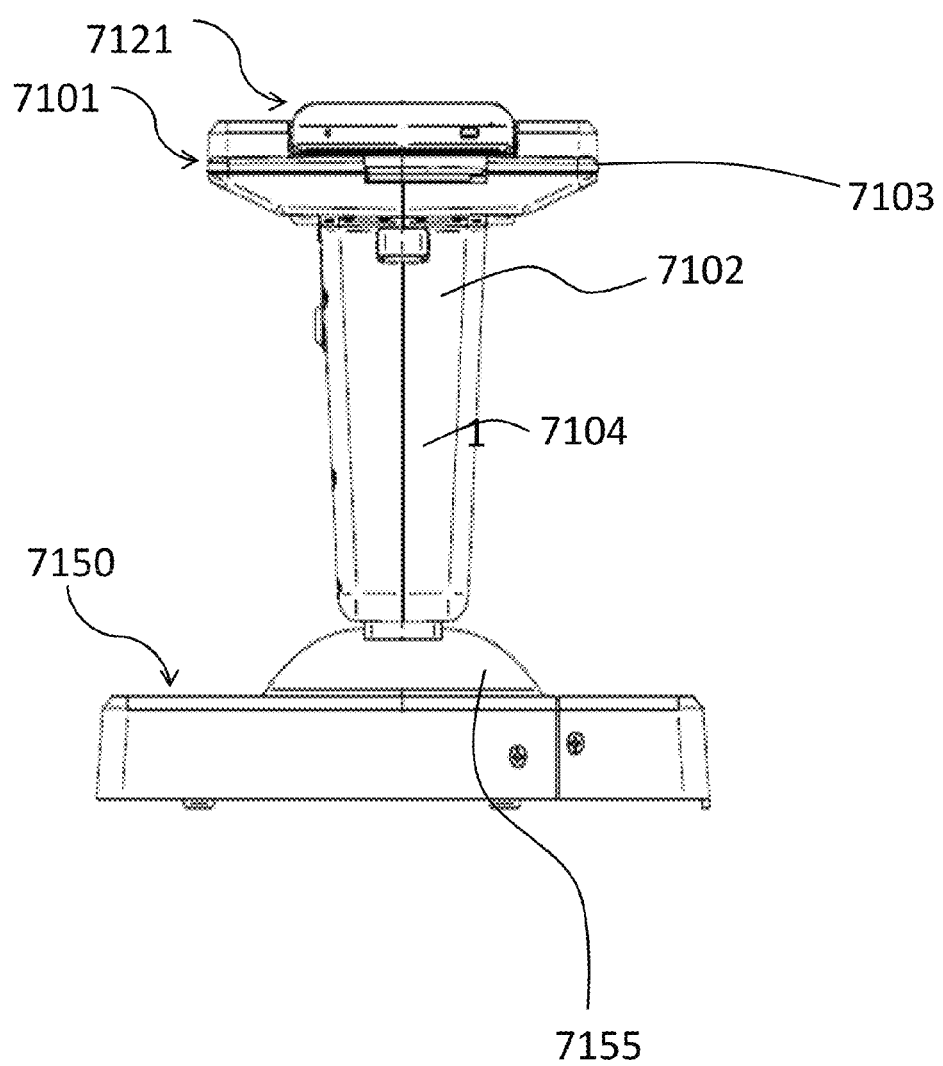
FIG. 27 is a front view of the Tablet Gun or mobile tablet fixed point of sale docking station of FIG. 23.
Figure 28:
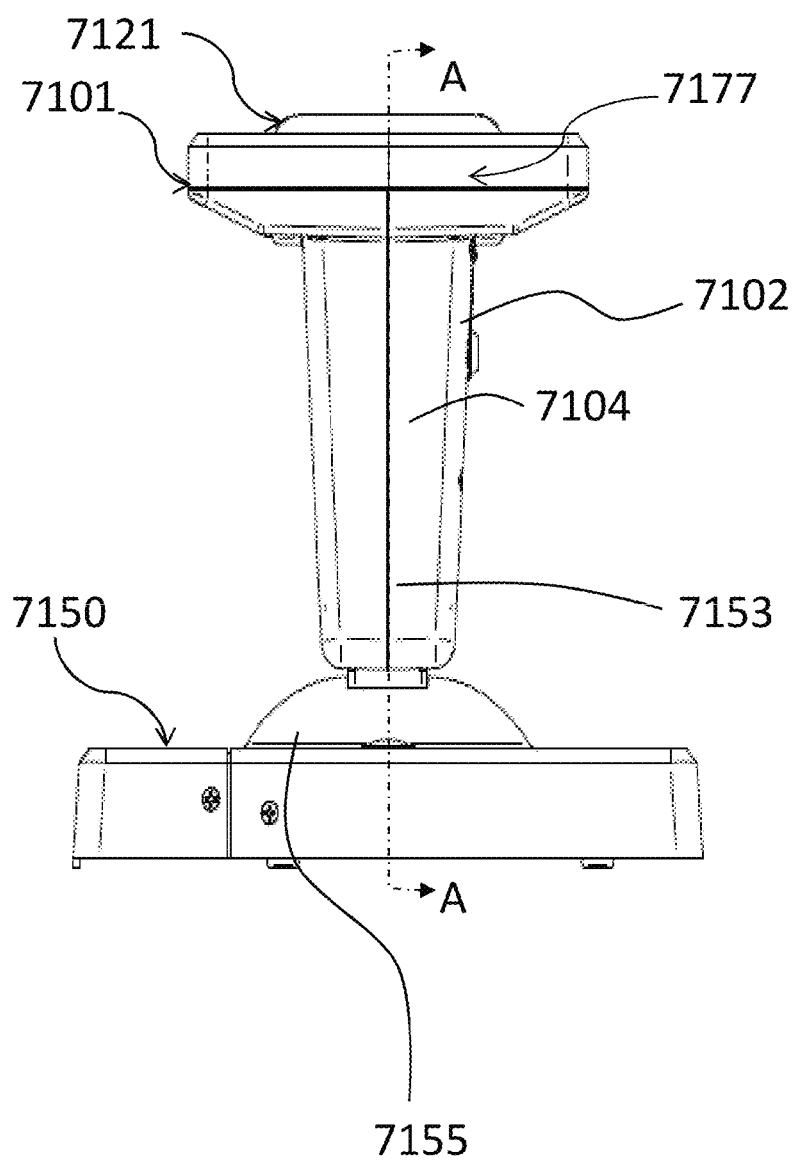
FIG. 28 is a back view of the Tablet Gun or mobile tablet docked within the fixed POS docking station of FIG. 23.
Figure 29:
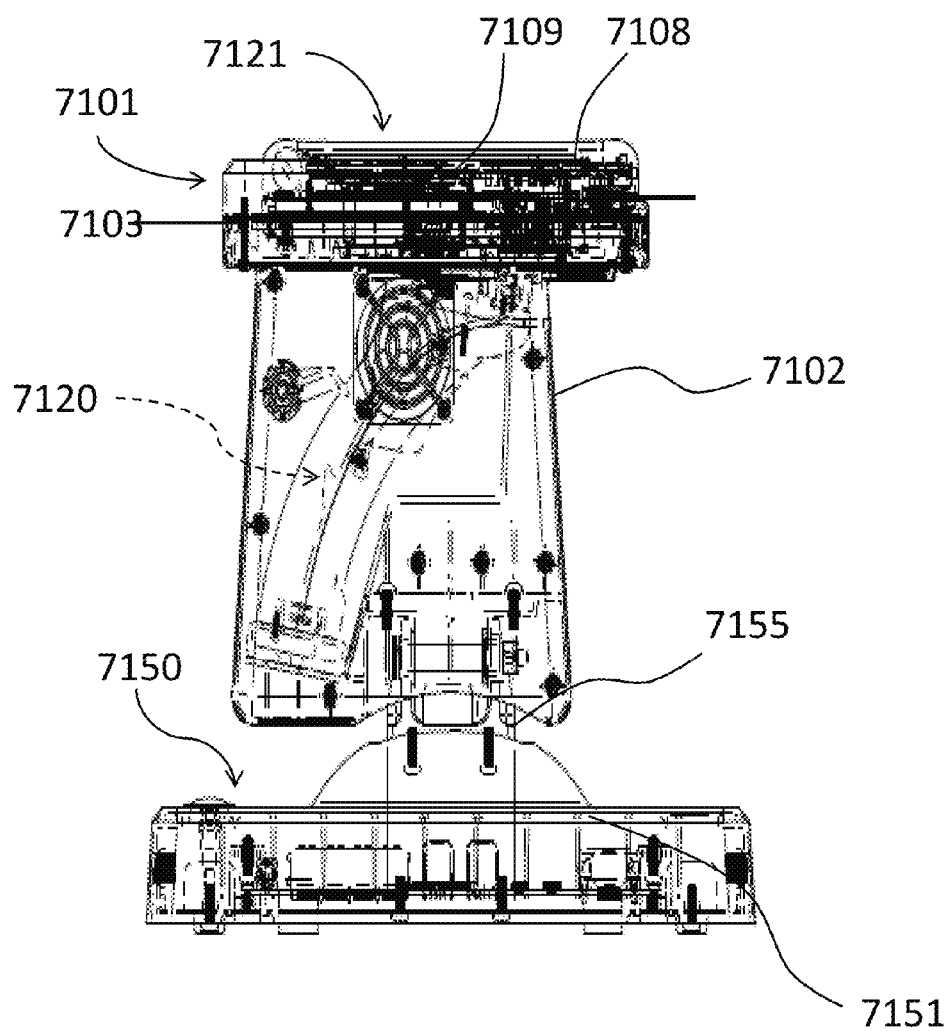
FIG. 29 is a cross-sectional view of the Tablet Gun or mobile tablet docked within the fixed POS docking station of FIG. 23, taken along line A-A of FIG. 28.

FIG. 23 is a top side view depicting an embodiment of the subject Tablet Gun or mobile tablet docked within the fixed POS docking station. FIG. 24 is a top plan view depicting the Tablet Gun or mobile tablet docked within the fixed POS docking station of FIG. 23. FIG. 25 is a first side view depicting the Tablet Gun or mobile tablet docked within the fixed POS docking station of FIG. 23. FIG. 26 is a second side view of the Tablet Gun or mobile tablet docked within the fixed POS docking station of FIG. 23. FIG. 27 is a front view of the Tablet Gun or mobile tablet fixed point of sale docking station of FIG. 23. FIG. 28 is a back view of the Tablet Gun or mobile tablet docked within the fixed POS docking station of FIG. 23. FIG. 29 is a cross-sectional view of the Tablet Gun or mobile tablet docked within the fixed POS docking station of FIG. 23, taken along line A-A of FIG. 28.

Referring to FIGS. 23-29, the fixed POS docking station 7100 for a mobile scanner gun system with mobile tablet device has an upper receiver for processing retail store POS sales transactions. The docking station 7100 has an upper housing assembly 7101 adapted to house a mobile barcode scanner gun system 7120 with a table 7121, as shown, in a "cradle fashion". A tablet cradle enclosure 7102 is provided having a base 7103 (see FIG. 25) in a top frame 7105 with a body 7104 and designed to receive and fit snuggly around the mobile barcode scanner gun system 7120 with mobile tablet device 7121 providing stability and a look of integration. Preferably, the top frame 7105 includes two finger slot recessions 7109 on each side of a long edge 7108 of the upper housing assembly 7101 to provide quick and easy removal of the mobile barcode scanner gun system 7120 with mobile tablet device 7121. Two electrical (spring loaded) pogo pin connectors having a housing integrated with a secondary printed circuit board (PCB1) are located within the base of the tablet cradle enclosure.

A base housing assembly 7150 is provided comprising a top portion 7151 with an integrated scanner activation button 7152 for use with a barcode scanner with the mobile barcode scanner gun system with mobile tablet device when docked in the fixed POS docking station. A plurality of Universal Serial Bus (USB) mobile input devices are in communication with the mobile scanner gun, via integration within and/or through USB attachment, including the barcode scanner, MSR and EMV payment card readers which have direct USB access to a PIN Entry Device (PED) located within fixed POS docking station and a Near Field Communications (NFC) reader through a specialized universal serial bus wiring harness, as shown generally at 7177. A Main Printed Circuit Board (PCB) (as described hereinafter in more detail) is provided having a previously programmed Electrically Erasable Programmable Read-Only Memory (EEPROM) controlling all MSR, EMV or NFC operations and actions of the MSR input device. When a customer payment card is swiped through the MSR slot or an EMV reader and by inserting a customer payment card into the EMV reader slot or an NFC reader and by "tapping" a customer payment card against the NFC reader for processing customer payment through the proper secured bank card processing network, the actions are activated. Activating the MSR, EMV or NFC operations causes the EEPROM of the Main PCB to communicate with the mobile tablet device, launching the application software to ready the mobile tablet device for receiving customer payment card data.

A base mounting plate 7152 is adapted for attachment to an under cabinet mounting system to provide security and stability to the fixed POS docking station. Preferably the base housing assembly further comprises a detachable rear port cover 7153 for access within the housing. A primary printed circuit board (PCB2) located on the base mounting plate operates with at least one USB, Ethernet, debugging Serial ports, scan switch interface and an external power supply port. The top portion 7151 further includes a tilting and rotational mechanism 7155 that connects the base housing assembly 7150 to the upper housing assembly 7101. The tilting mechanism and rotational mechanism is adapted to allow the upper housing assembly to rotate and tilt "toward" or "away" from a user throughout its rotation allowing the user proper viewing orientation of the fixed POS docking station from any position. The secondary printed circuit board (PCB1) is connected to the primary printed circuit board (PCB2) through a custom interface cable operable to facilitate electrical communication between the fixed POS docking station and the mobile barcode scanner gun system with mobile tablet device. USB, Ethernet, debugging Serial ports, scan switch interface and power supply port housed within the base housing assembly are fully operable with the mobile barcode scanner gun system with mobile tablet device and can be connected to a variety of POS peripheral devices and other store systems peripheral devices.

The Upper Housing Assembly further preferably includes an extended table top/table top extension 7106 extending from and surrounding the tablet cradle enclosure 7102. The extended table top 7106 extends flush from the top frame/bracket 7105 of the table cradle enclosure 7102. It is adapted to provide additional hand support and comfort for a user and a more thorough look of integration. Preferably, the table top extension 7106 completely surrounds a top bracket/frame 7105 of the tablet cradle enclosure. As constructed, the table top extension 7106 provides an enhanced surface area for the user to rest his/her hands and to provide for an ergonomically constructed device. Preferably, the table top extension 7106 has a length ranging from one inch to six inches.

Figure 30:
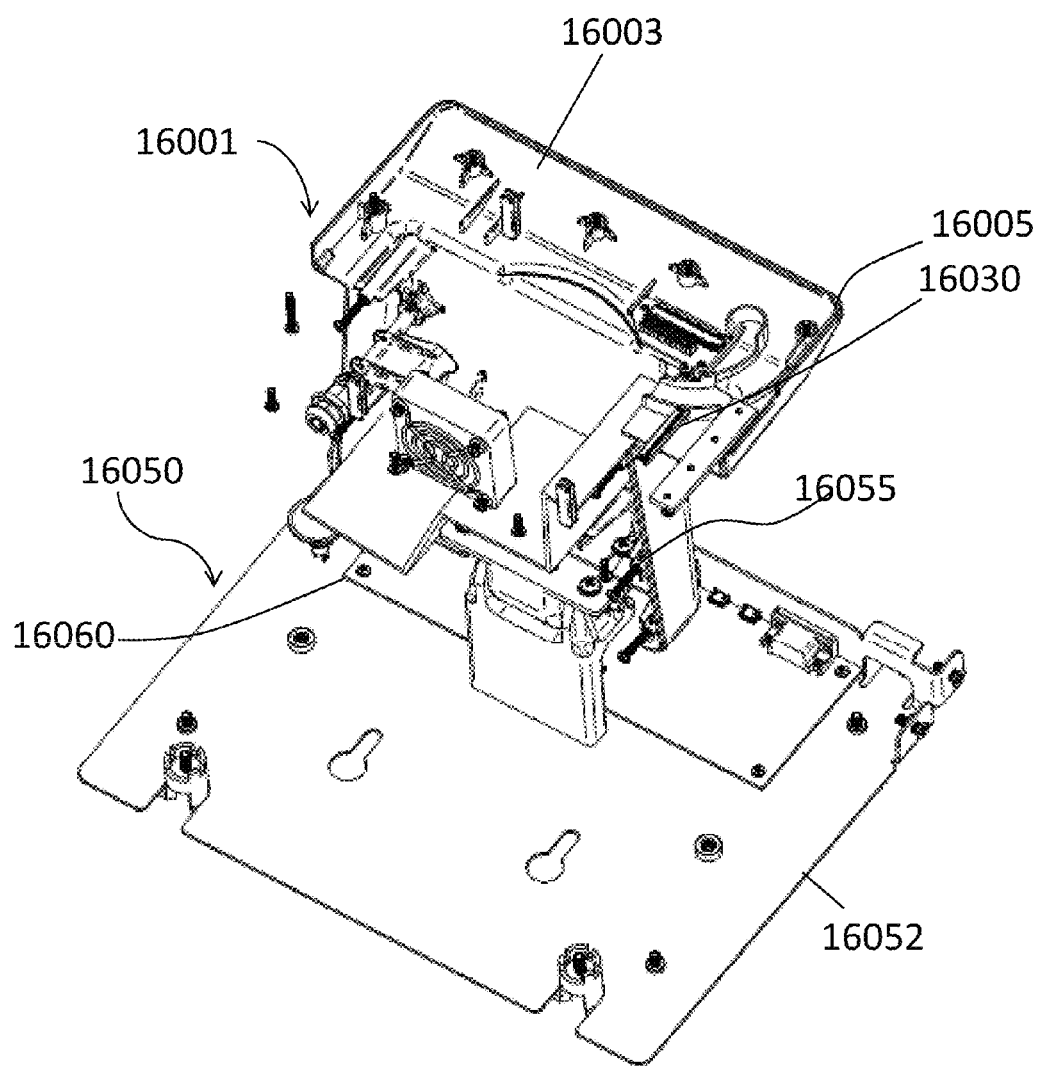
FIG. 30 shows a view of an embodiment of the fixed POS docking station with the top covering removed.
Figure 31:
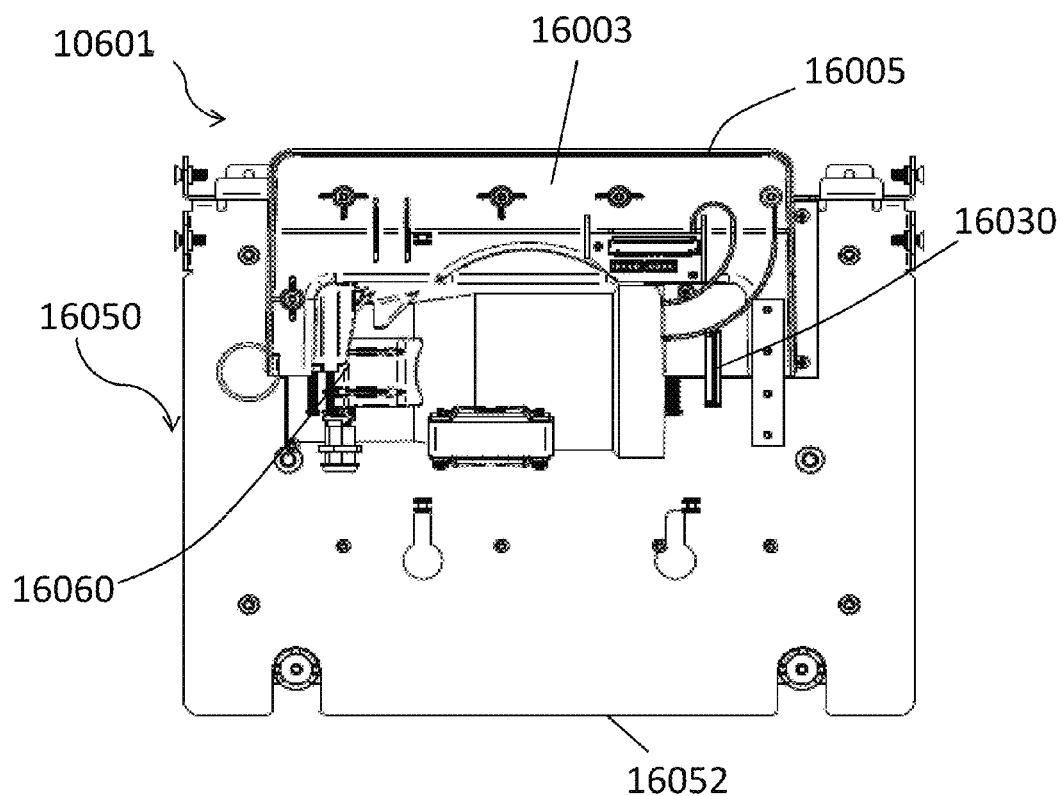
FIG. 31 is a top plan view of the fixed POS docking station of FIG. 30.
Figure 32:
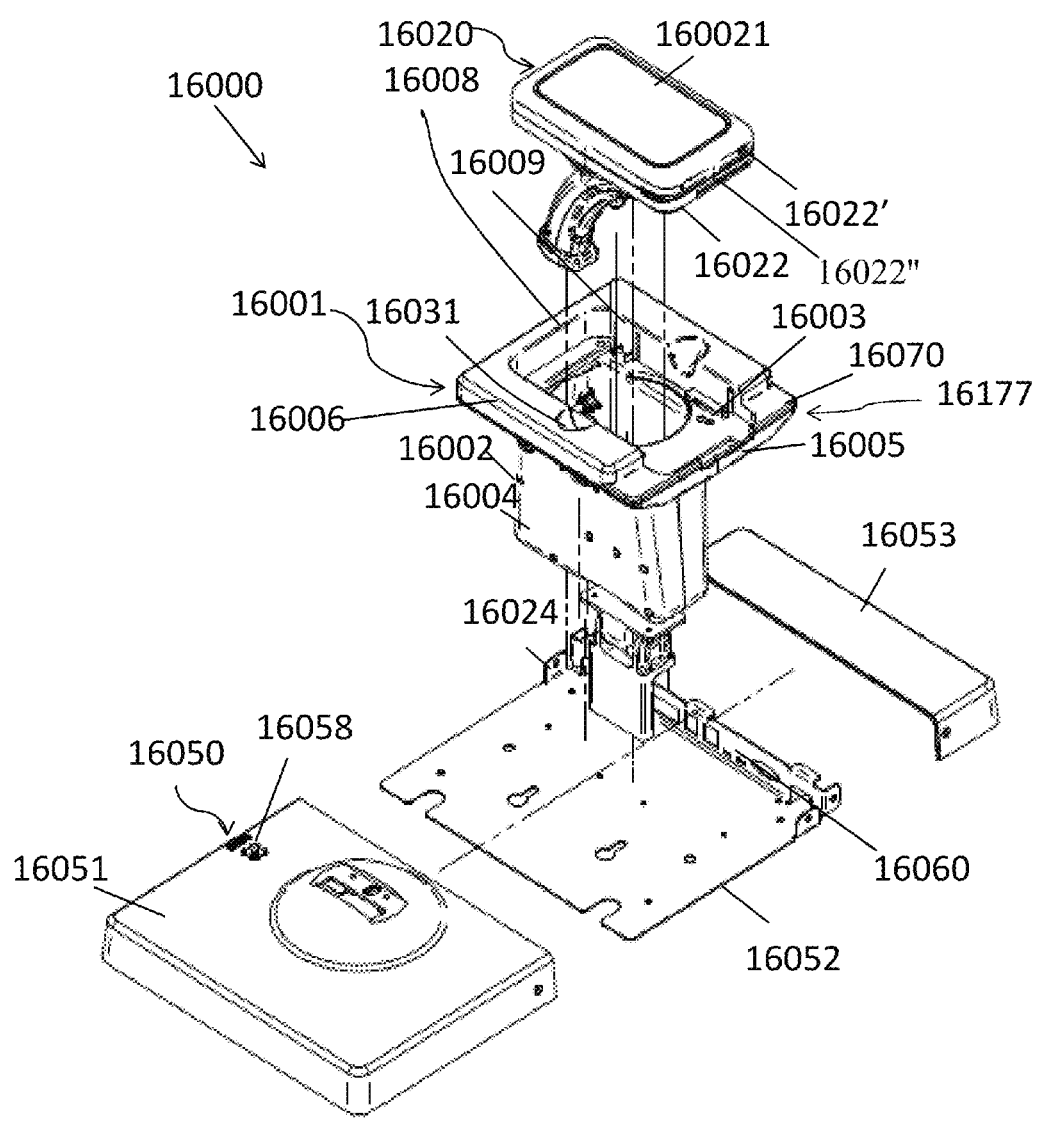
FIG. 32 is a top plan view of each of the components of the fixed POS docking station device of FIG. 31 as it is being assembled.

FIG. 30 shows a view of an embodiment of the fixed POS docking station with the top covering removed. FIG. 31 is a top plan view of the fixed POS docking station of FIG. 30. FIG. 32 is a top plan view of each of the components of the fixed POS docking station device of FIG. 31 as it is being assembled.

Referring to FIGS. 30-32, the fixed POS docking station 16000 is adapted to receive a mobile scanner gun system with mobile tablet device 16020 (or stand-alone mobile tablet) having an upper receiver 16022 for processing a retail store POS sales transaction. The fixed POS docking station 16000 has an Upper Housing assembly 16001 comprising a tablet cradle enclosure 16002 having a base 16003 with a body 16004 and a top frame 16005 designed to receive and fit snuggly around the mobile barcode scanner gun system with mobile tablet device 16021. Preferably, the top frame 16005 includes two finger slot recessions 16009 on each side of a long edge 16008 of the upper housing assembly 16001 to provide quick and easy removal of the mobile barcode scanner gun system with mobile tablet device 16021. Two electrical (spring loaded) pogo pin connectors having a housing 16031 is integrated with a secondary printed circuit board (PCB1) 16031, located within the base 16003 of the tablet cradle enclosure 16002. Preferably the two electrical (spring loaded) pogo pin connectors housing 16031 are ten (10) pin electrical (spring loaded) pogo pin connectors.

A plurality of Universal Serial Bus (USB) mobile input devices are in communication with the mobile scanner gun, including the barcode scanner, MSR and EMV payment card readers which have direct USB access to a PIN Entry Device (PED) located within fixed POS docking station and a Near Field Communications (NFC) reader through a specialized universal serial bus wiring harness, as shown generally at 16177. These input devices may be integrated within the tablet gun, as shown generally in FIGS. 1-22, or may be in communication through USB connectivity, as shown generally in FIGS. 23-36. A Main Printed Circuit Board (PCB) (as described hereinafter in more detail) is provided having a previously programmed Electrically Erasable Programmable Read-Only Memory (EEPROM) controlling all MSR, EMV or NFC operations and actions of the MSR input device. When a customer payment card is swiped through the MSR slot or an EMV reader and by inserting a customer payment card into the EMV reader slot or an NFC reader and by "tapping" a customer payment card against the NFC reader for processing customer payment through the proper secured bank card processing network, the actions are activated. Activating the MSR, EMV or NFC operations causes the EEPROM of the Main PCB to communicate with the mobile tablet device, launching the application software to ready the mobile tablet device for receiving customer payment card data.

Four magnets are preferably integrated generally on each corner on the bottom of the Upper Housing Assembly, with corresponding magnetic slugs installed in matching locations on the underside of the Upper Receiver of the mobile barcode scanner gun system or stand-alone mobile tablet 16021. The Upper Housing Assembly preferably further comprises two payment processing slots 16070 adapted to align a magnetic stripe reader (MSR) 16022' on the mobile barcode scanner gun system or stand-alone mobile tablet 16021 to operate while docked in the fixed POS docking station. These components are adapted to allow a payment card to pass through the MSR or dipped into the EMV reader installed within the mobile barcode scanner gun system or stand-alone mobile tablet without restriction. Preferably, the Upper Housing Assembly further comprises a barcode scanner opening (button actuator shown at 16024, FIG. 32) adapted to align with a barcode scanner installed on the mobile barcode scanner gun system 16020 tablet 16021/or stand-alone mobile tablet to properly operate the barcode scanner while the mobile barcode scanner gun system or stand-alone mobile tablet is docked in the fixed POS docking station through use of the barcode scanner switch located on the base housing assembly.

A base housing assembly 16050 comprises a top portion 16051 with an integrated scanner activation button 16085 for use with a barcode scanner integrated with the mobile barcode scanner gun system with mobile tablet device when docked in the fixed POS docking station. A base mounting plate 16052 is adapted for attachment to an under cabinet mounting system to provide security and stability to the fixed POS docking station. Preferably the Base Housing Assembly further comprises a detachable rear port cover 16053 for access within the housing. A primary printed circuit board (PCB2) 16060 is located on the base mounting plate operable with at least one USB, Ethernet, debugging Serial ports, scan switch interface and an external power supply port. The top portion 16051 further includes a tilting and rotational mechanism 16055 that connects the base housing assembly 16050 to the upper housing assembly 16001.

The Upper Housing Assembly further preferably includes an extended table top/table top extension 16006 extending from and surrounding the tablet cradle enclosure 16002. The extended table top 16006 extends flush from the top frame/bracket 16005 of the table cradle enclosure 16002. It is adapted to provide additional hand support and comfort for a user and a more thorough look of integration. Preferably, the table top extension 16006 completely surrounds a top bracket/frame 16005 of the tablet cradle enclosure. As constructed, the table top extension 16006 provides an enhanced surface area for the user to rest his/her hands, and provides an ergonomically constructed device. Preferably, the table top extension 16006 has a length ranging from one inch to six inches.

Figure 33:
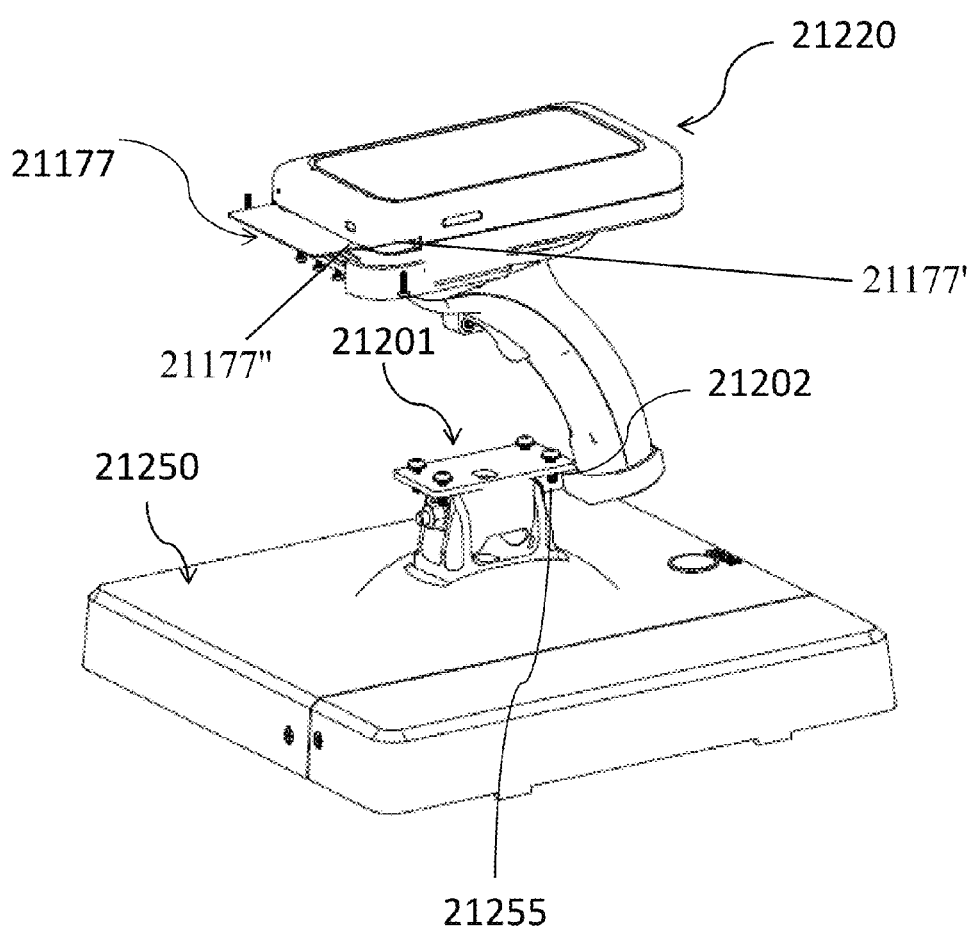
FIG. 33 is a top plan view of an embodiment of the fixed POS docking station device wherein no case is provided.

FIG. 33 is a top plan view of an embodiment of the fixed POS docking station device wherein no case is provided. In this embodiment, the fixed POS docking station is adapted to receive a mobile scanner gun system 21220 with mobile tablet device as described herein. The fixed POS docking station has an upper housing assembly 21201 constructed having a tablet cradle 21202. A base housing assembly 21250 includes a tilting and rotational mechanism 21255 that connects the base housing assembly 21250 to the upper housing assembly 21201. A plurality of Universal Serial Bus (USB) mobile input devices are in communication with the mobile scanner gun, including the barcode scanner, MSR 21177' and EMV 21177" payment card readers which have direct USB access to a PIN Entry Device (PED) located within fixed POS docking station and a Near Field Communications (NFC) reader through a specialized universal serial bus wiring harness, shown generally at 21177. A Main Printed Circuit Board (PCB) (as described hereinafter in more detail) is provided having a previously programmed Electrically Erasable Programmable Read-Only Memory (EEPROM) controlling all MSR, EMV or NFC operations and actions of the MSR input device.

Figure 34:
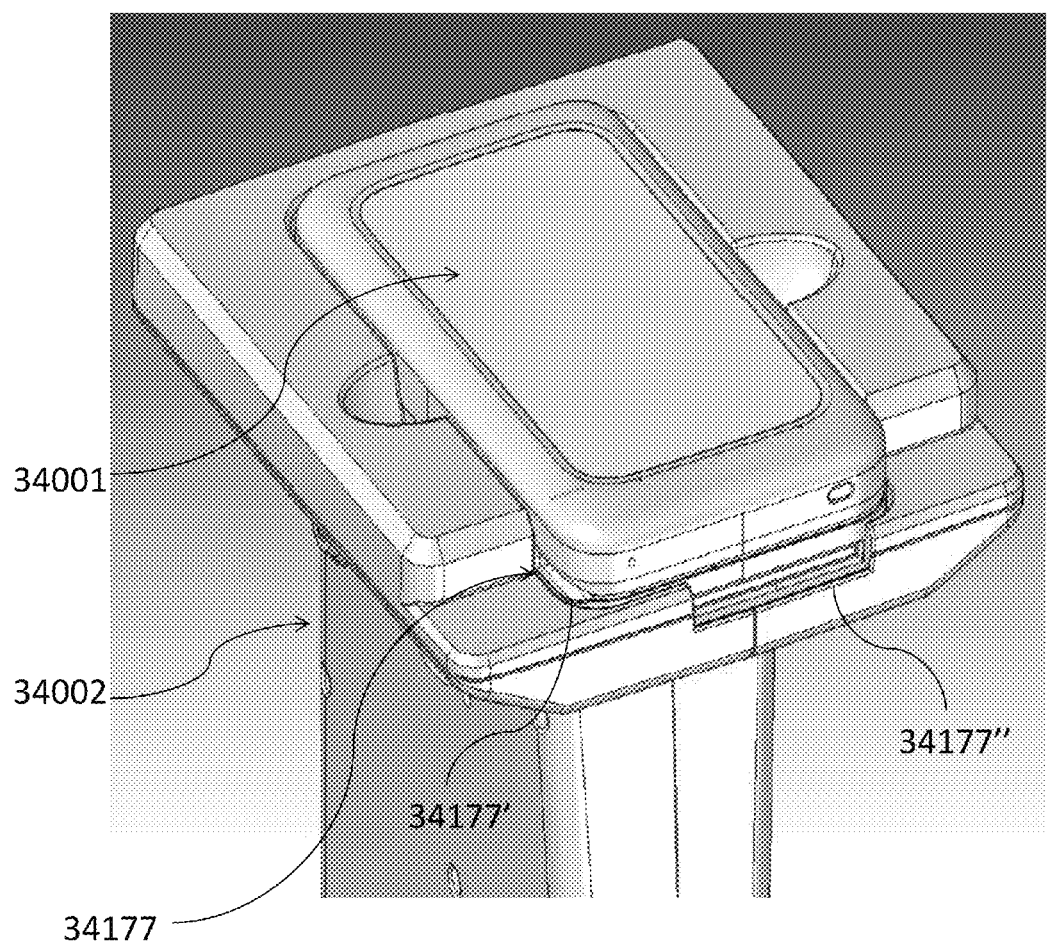
FIG. 34 is a top view of a mobile tablet docked within the fixed POS docking station illustrating the MSR and EMV reader, shown without a card inserted in the EMV reader.
Figure 35:
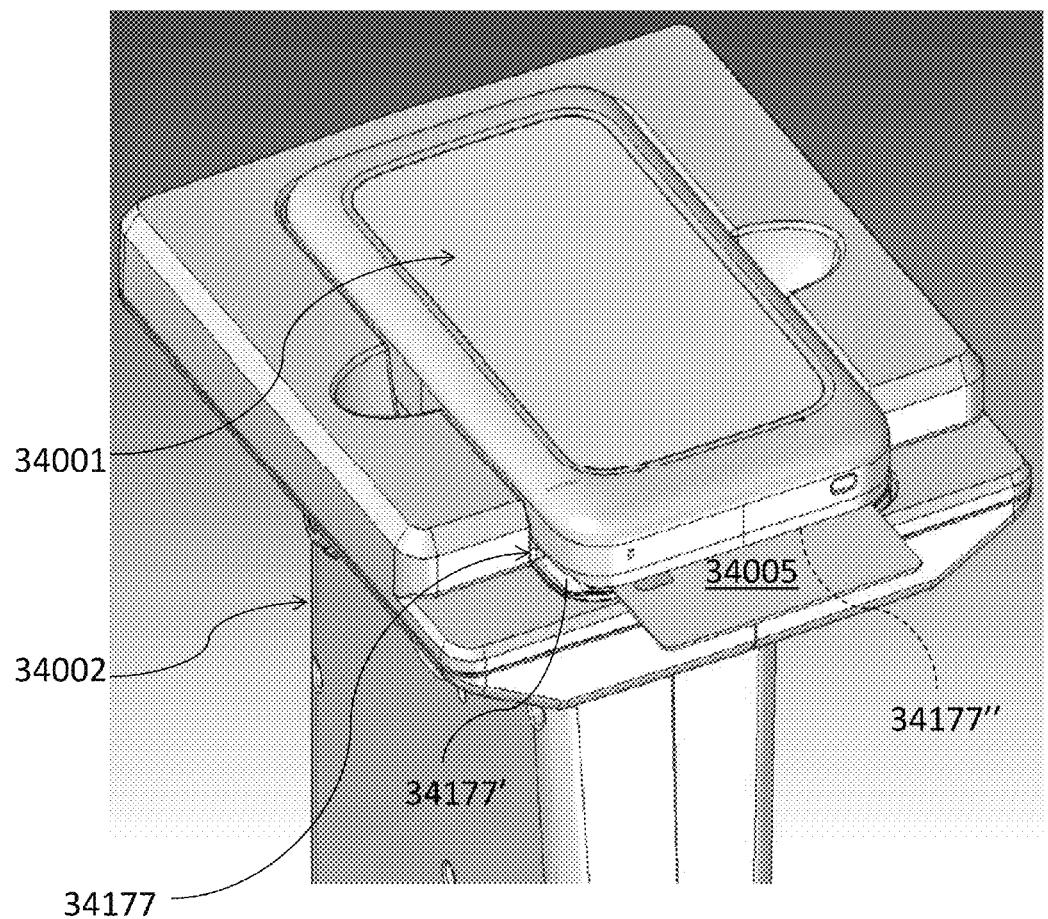
FIG. 35 is the top view of FIG. 34 with a card shown inserted in the MSR.
Figure 36:
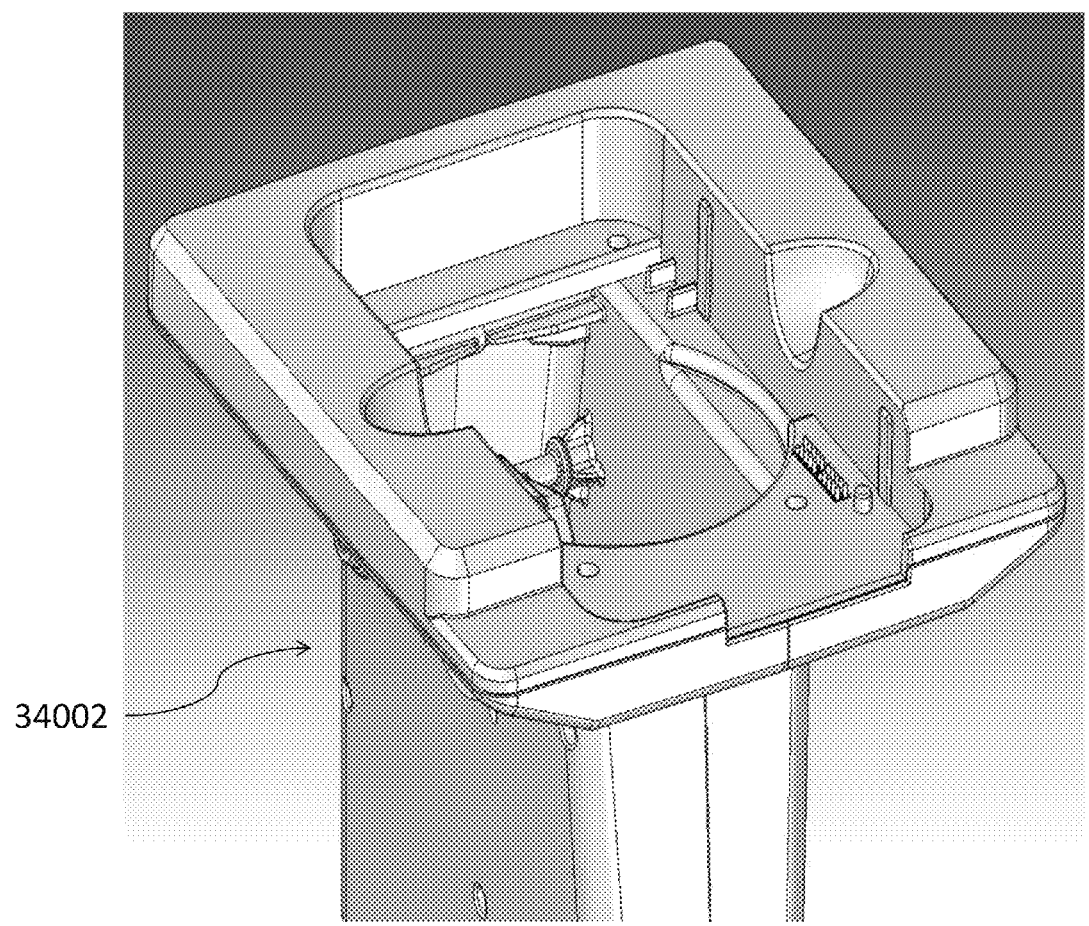
FIG. 36 is the top view of FIG. 34 of the docking station internal construction with the mobile tablet removed from the docking station.

FIG. 34 shows a top view of a mobile tablet 34001 docked within a fixed POS docking station 34002 illustrating a barcode scanner, MSR 34177' and EMV 34177" payment card readers which have direct USB access to a PIN Entry Device (PED) located within fixed POS docking station and a Near Field Communications (NFC) reader through a specialized universal serial bus wiring harness, shown generally at 34177. FIG. 35 shows the top view of FIG. 34 with a card 35001 shown inserted in the MSR 34177'. FIG. 36 shows the top view of FIG. 34 of the internal construction of the fixed POS docking station 34002 with the mobile tablet 34001.

The fixed POS Docking Station is especially suited for a Wi-Fi and wireless cellular mobile scanner gun system running a real-time store level inventory management suite of applications, StoreMobileRF™, connected directly to the corporate ERP system and running a POS application, StoreMS Mobile™, connected directly to the POS store systems server, for customer purchases throughout the retail store and well beyond its walls. There is a need in the art for the subject fixed POS docking station as it has been surprisingly and unexpectedly found that when serving customers with the Tablet Gun/mobile scanner gun systems or stand-alone mobile tablet devices, handling the merchandise poses difficulties in that holding the devices can be cumbersome. The solution for this unexpected problem has resulted in a surprising combination of a number of necessary functions into the subject fixed POS docking station. The subject resultant fixed POS docking station has a number of unique attributes that, in combination, serve a variety of purposes. Operational features include: i) charging the Tablet Gun; ii) providing "hands free" operation of the Tablet Gun (effectively a workstation); iii) providing 3 secondary Ethernet connections for peripheral devices such as a receipt printer, payment card pin pad, third party loyalty card devices, etc. iv) providing a primary Ethernet connection between the Tablet Gun and the store network, wherein the Ethernet switch will therefore have 5 ports: 1 internal port and 4 external ports; v) providing two 4 port USB hubs, including four standard USB ports, two 12V powered USB ports and one 24V USB powered port for peripheral hardware such an external barcode scanner and a cash drawer; vi) providing a scanner trigger/button on the housing of the fixed POS docking station as a parallel trigger for operation while the Tablet Gun is docked; vii) providing Drop in/Pull out docking for the Tablet Gun. Providing seamless operation when moving from a "docked" condition to an "undocked" condition, in that no physical connections need to be "disconnected". Providing a mechanism wherein gravity establishes the spring loaded pin connection to the underside of the Upper Receiver.

The mobile scanner gun appointed to be housed within the subject fixed POS docking station comprises a main body portion extending toward a handle portion. The main body portion has a base, side walls, a front wall and a back wall constructed to form an interior cavity, wherein the front wall includes an aperture with a lens recessed therein. The front wall has a trigger member located near the base of the main body. A USB barcode scanner input device is mounted above and in front of the trigger. The scanner has two drivers, including 1) a native device driver and 2) a keyboard input driver, the barcode scanner input device is in communication with the trigger for initiating a scan of a barcode. USB payment card input devices include an MSR, an EMV reader and NFC reader input are integrated within the upper receiver of the mobile scanner gun system and communicates with the mobile tablet device for carrying out and processing a sales transaction, the MSR and EMV reader have USB access to a PIN Entry Device (PED) located within the top of the Base Housing Assembly of the fixed POS docking station for completing customer PIN secured payment cards transactions. Further, the MSR, EMV reader and NFC reader transactions are secured and certified as required by the PCI council end to end to a variety of industry standard PCI certified bank card processors. The top wall of the main body portion includes an attachment means comprising a base mount universal receiver with rotational coupling adapted to interchangeably mount and communicate through a specialized universal serial bus wiring harness with the mobile device having a system integrated therein that enables store level real-time inventory management and a fully functioning POS capability for selling merchandise in a retail sales environment and global inventory management. The base mount universal receiver with rotational coupling enables the mobile tablet device to be viewed in both portrait mode and landscape mode without operational delay of the system.

The mobile scanner gun system used for transacting customer sales in a retail store through a mobile POS application further comprises a previously programmed electrically erasable programmable read only memory (EEPROM) controlling all actions of the USB scanner input device and the scan gun trigger for activating a barcode scan operation of an item of interest for a customer by an employee of a retail establishment. The barcode scan operation is adapted to cause the EEPROM of the main printed circuit board (Main PCB) to communicate with the mobile tablet device, launching the application software to ready the mobile tablet device for receiving a scanned barcode. The application communicates with the corporate ERP system to obtain detailed information for daily inventory management purposes including such tasks as physical inventory, cycle counting, inventory receiving, store to store transfers, return to vendor and product re-ticketing. In operation and function, the customer purchases a product from any retail store employee having a mobile scanner gun system receiving full product details, price, electronic and physical coupons, promotions, and customer loyalty data and rewards available, and charges the purchase in a friendly, efficient, informative, and very mobile atmosphere without having the need to bring the product to a central checkout station and waiting in queue to check out.

The system, method, and devices used to practice the present invention provide a mobile scanner gun system with a mobile tablet device integration capability therein adapted to be carried by one or more employees in a retail environment. In turn, the mobile tablet device integration includes several free standing applications that are capable of linking the user to a central corporate ERP system and the POS store systems server, which provides a system and method that executes daily inventory management objectives and POS customer checkout transactions. Uniquely, the method and mobile tablet device provide the ability to carry out daily inventory management functions for such tasks as physical inventory, cycle counting, inventory receiving, store to store transfers, return to vendor, product re-ticketing, and to operatively identify a product by its barcode, establish price, taxes, promotions, physical and electronic coupons and customer loyalty data and rewards available and process the sale of merchandise to a customer, regardless of the location of the inventory within the retail chain. From within the POS transaction, if the inventory is unavailable in the store, the sold inventory can be transferred from the warehouse, another store or special ordered from the vendor and made available at any store for customer pickup or shipped to a customer location. In the case the inventory is unavailable, once the transaction is completed on the mobile scanner gun system, the item and quantity of the selected fulfillment location is allocated within the central corporate ERP system.

The mobile scanner gun system has a mobile tablet device attached to a pistol grip base housing and connected thereto through a base mount universal receiver with rotational coupling. The upper receiver of the mobile scanner gun system has several USB payment card input devices including an MSR, an EMV reader both mounted on one edge of the mobile tablet device, an NFC reader mounted internally within the Upper Receiver casing. Further, a USB barcode scanner is incorporated within the pistol grip base, the scanner being operable by pressing a trigger provided in the mobile scanner gun.

The mobile tablet device is encased in a hardened case/shell designed to protect the device against drops and damage. The mobile tablet device includes software readable from the integrated system and method and includes several mobile applications selected for operation through the touch of an application icon. The mobile scanner gun system mobile applications have functionality to communicate wirelessly with a POS store systems server that is present within the store, a remote backup POS store systems server centrally located and the corporate ERP system through Wi-Fi and wireless cellular communication and secured using standard Wi-Fi Protected Access (WPA) and Wi-Fi Protected Access II (WPA2) wireless encryption methods. The application has functionality to order an electrically erasable programmable read only memory (EEPROM) present within the Main PCB located in the mobile tablet device upper receiver to conduct various functions and this directive is sent through the specialized universal serial bus wiring harness. The systemic communication for the USB devices, including the barcode scanner, the MSR, the EMV reader, the PIN Entry Device (PED) located within the Base Housing Assembly of the fixed POS docking station and the Near Field Communications (NFC) reader located either within the Upper Receiver of the Tablet Gun or within the Base Housing Assembly of the fixed POS docking station, is carried out through a specialized universal serial bus wiring harness integrated within the mobile tablet device, and occurs back and forth between the USB devices and the EEPROM, depending on the application function in operation.

The EEPROM of the Main PCB carries a programmed instruction set and works in conjunction with the mobile applications of the mobile tablet device. For example, if the barcode scan gun trigger of the device is pressed by the retail store employee according to the interest of a customer, this event is detected by the EEPROM of the Main PCB and is communicated to the mobile application within the mobile tablet device. The EEPROM interprets and parses the barcode read and formats it in a manner that is readily recognized by the mobile application. The mobile application communicates with the POS store systems server to obtain the details of the product scanned, its selling price, any physical and electronic coupons, promotions, and customer loyalty data and rewards available and the available inventory of the product chain-wide, including the warehouse. The mobile tablet device displays the entire data on the screen and the retail store employee may discuss these details to the customer allowing the customer to make a purchase decision. Optionally, the POS store systems server may suggest other similar products with enhanced functionality, reduced selling price and the like. Accordingly, the customer may view similar products and review product details to come to a purchase decision. Optionally, if the item is not available in the current store's inventory, the employee may suggest the item be shipped from the warehouse or another store within the chain.

When the customer reaches a purchase decision of a product displayed on the mobile tablet device screen, the employee of the store selects an application icon to invoke the mobile POS application. If shipping is required, the customer provides the customer name, address, contact telephone number, and email address if they are not already in the customer loyalty database. The customer provides a payment card to the retail store employee who then selects on of the USB payment card input devices including swiping the payment card in the MSR slot or dipping the payment card into the EMV reader or tapping the payment card on the NFC reader. "Payment Card" as used herein includes the proliferation of bank cards having magnetic track data or "smart computer chips", including credit cards and debit cards, retailer charge cards, gift cards, etc. The MSR track data is encrypted using industry standard Triple DES with DUKPT by the MSR reader before the data is transferred to the mobile POS application. The EMV "smart computer chip" uses a PCI certified communications process from the EMV reader through to the bank card processor. Once the payment card transaction is complete, the employee allows the customer to sign their name on the device or enter in their PIN on the PIN Entry Device (PED) to validate the sale and then the information received from the customer is securely transferred by wireless communication to the POS store systems server, which processes the payment card purchase by contacting the bank card processor via a PCI certified network. Upon receiving credit authorization of the purchase, the mobile tablet device of the mobile scanner gun system displays information that the purchase is complete and the employee bags the purchased merchandise and delivers it to the customer. The POS store systems server updates the corporate ERP system, adjusting the inventory on-hand of the merchandise sold, thus the update becomes visible chain-wide. The POS store systems server sends an email of the receipt to the customer's email address, which may be readily viewed in a smart phone carried by the customer. If desired, a hard copy of the receipt for the purchase is printed on a local printer within the retail establishment via the store's local network.

With this system, the customer does not have to bring the merchandise to a central check out location. The purchase operation is conducted at the point-of-sale by a retail store employee carrying a mobile scanner gun system and has up to date information concerning product inventory of any item in their retail location or chain-wide, along with current details, physical and electronic coupons, promotions and customer loyalty data and rewards available.

The following paragraph details the elements, which collectively enable operation of the system as detailed hereinabove. The mobile tablet device of the mobile scanner gun system preferably comprises a custom-developed, industry hardened mobile tablet device utilizing a specialized universal serial bus wiring harness to communicate with a plurality of USB devices such as MSRs and barcode scanners/readers, including an MSR, an EMV reader, both with USB access to a PIN Entry Device (PED) located within the Base Housing Assembly of the fixed POS docking station if required by payment card and a Near Field Communications (NFC) reader. Various operating systems, such as those associated with the trade name Android (Google), iOS (Apple), and Windows (Microsoft) are contemplated. The mobile tablet device has custom programmed mobile applications on the Android platform. The mobile tablet device (upper receiver) is rotatably connected to several base housing concepts, each with a USB scanner input device integrated into the base. The rotational coupling permits changing the orientation of the mobile tablet device in the portrait mode or in the landscape mode of the mobile tablet device display screen. The upper receiver has industry standard USB payment card input devices including an MSR and an EMV reader, both of which are integrated along the short edge of the mobile tablet device for easy access by the user regardless of which base housing is selected for use, and can access a PIN Entry Device (PED) via USB to complete payment card transactions that require the customer to enter their unique payment card PIN. Further, a NFC reader input device has been integrated within the casing of the Upper Receiver in such a position that it allows an NFC smartphone or chip embedded payment card to communicate with it simply by waving or tapping the smartphone or chip embedded payment card over or on the upper receiver. A key feature of the invention is an electrically erasable programmable read only memory (EEPROM) that has a previously programmed instruction set present within the Main PCB. The EEPROM of the Main PCB is connected to the mobile tablet device and can process the command issued by the mobile application to instruct a variety of USB devices including the barcode scanner, the MSR, the EMV reader, the PIN Entry Device (PED) located within the Base Housing Assembly of the fixed POS docking station and the NFC reader located either within the Upper Receiver of the Tablet Gun or within the Base Housing Assembly of the fixed POS docking station to acquire required data. The EEPROM of the Main PCB organizes the data in proper format and delivers it to the mobile tablet device through the specialized universal serial bus wiring harness. Due to the use of the EEPROM, which can process barcode and payment card information, the attached mobile tablet device can perform secure distributed sales within a retail establishment. Each of the employees of the retail establishment knows instantaneously the inventory of any particular item chain-wide, the barcode of an item that is scanned along with its price as well as discounts, electronic and physical coupons, promotions, and customer loyalty data and rewards available. Thus a customer may look at several product items and ask the employee of the retail organization to know its price, details concerning the item, and any promotion that is available, including customer loyalty rewards. This provides a pleasant, informative interaction between the customer and the employee of the retail organization, establishing one-on-one, face-to-face relationship, which is appreciated by the customer and results in an improved sales environment.

In its preferred embodiment, the mobile scanner gun system of the present invention comprises:

i) a mobile tablet device having Wi-Fi cellular communicative capability with the POS store systems server, attached to a pistol gun base housing through a base mount universal receiver with rotational coupling, forming a mobile scanner gun system carried by an employee in a retail store;

ii) the mobile tablet device having application software capable of commanding an electrically erasable programmable read only memory (EEPROM) present on the Main PCB to acquire barcode scan or obtain payment card information from a swiped payment card via the MSR, a dipped payment card via the EMV reader, PIN data entered by the customer via the PIN Entry Device (PED) or tapped payment card via the NFC reader;

iii) the USB barcode scanner input device having a gun trigger for activating a scan operation by an employee of a retail establishment, at which point the EEPROM of the Main PCB communicates with the mobile tablet device, launching the application software to get the mobile tablet device ready for received barcode;

iv) the mobile POS application software communicating with the POS store systems server and corporate ERP system to obtain detailed information of the product scanned, its inventory, selling price, electronic and physical coupons, promotions, and customer loyalty data and rewards available;

v) the employee of the retail establishment communicating to a customer the description, price, electronic and physical coupons, promotion data, and customer loyalty data and rewards of each item scanned;

vi) the customer deciding to purchase the item and the employee accessing a POS transaction routine of the mobile POS application software, entering customer name, address and e-mail address if needed, and swiping customer data, and the EEPROM communicating formatted customer data securely to the POS store systems server;

vii) the POS store systems server contacting a bank card processor for authorization of the purchase and communicating to the mobile tablet device that the customer has purchased the scanned merchandise;

viii) the POS store systems server that communicates with the corporate ERP system to adjust the product inventory to become visible chain-wide, sending a receipt to the e-mail address of the customer and/or printing a hard copy of the transaction on a store network printer;

ix) the mobile tablet device being operative, in the event that the authorization is denied, to inform the employee of this credit denial, so that the customer is informed, and can provide alternative payment;

whereby the customer purchases a product from any retail store employee having a mobile scanner gun system receiving full product details, price, electronic or physical coupons, promotions and customer loyalty data and rewards and tenders the transaction in a friendly atmosphere without having any need to bring the product to a central checkout station and waiting in queue to check out.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A mobile scanner gun system for processing a retail store point of sale (POS) transaction and performing real-time daily store level inventory management functions, comprising:
   a. a main body portion extending toward a handle portion forming a mobile scanner gun;
   b. said main body portion having a top wall, side walls, a front wall and a back wall constructed to form an interior cavity, wherein said front wall includes an aperture with a lens recessed therein;
   c. a plurality of Universal Serial Bus (USB) mobile input devices being in communication with said mobile scanner gun, including a barcode scanner, Magnetic Stripe Reader (MSR) and/or Europay, MasterCard, and Visa (EMV) payment card readers which have direct universal serial bus (USB) access to a personal identification number (PIN) Entry Device (PED) located within fixed POS docking station and a Near Field Communications (NFC) reader through a specialized universal serial bus wiring harness;
   d. said handle portion having a trigger member in communication with said scanner engine for initiating a scan of a barcode;
   e. said top wall of said main body portion having an attachment means thereon, wherein said attachment means is adapted to receive a mobile tablet device housing having both MSR and EMV payment card reader slots and being adapted to receive and house therein said mobile tablet device having an application software providing wireless secure communicative capability with a POS store systems server in a retail store, which is connected to a corporate Enterprise Resource Planning (ERP) system;
   f. a specialized universal series bus wiring harness adapted to be attached to and communicate with said mobile tablet device for communicating with a system integrated therein that enables store level real-time inventory management and a fully functioning POS capability for selling merchandise in a retail sales environment, said specialized universal serial bus wiring harness being removable from said top wall of said main body portion and adapted to be readily docked in different base housings including portable housings and fixed docked workstation housings thereby providing portability and interchangeability;
   g. a Main Printed Circuit Board (PCB) having a previously programmed Electrically Erasable Programmable Read-Only Memory (EEPROM) controlling all MSR, EMV or NFC operations and actions of said MSR input device when a customer payment card is swiped through the MSR slot or an EMV reader and by inserting a customer payment card into the EMV reader slot or an NFC reader and by "tapping" a customer payment card against the NFC reader for processing customer payment through the proper secured bank card processing network;
   h. activating said MSR, EMV or NFC operations causing said EEPROM of the Main PCB to communicate with said mobile tablet device, launching said application software to ready said mobile tablet device for receiving customer payment card data;
   i. said POS store systems server contacting a bank card authorization processor approving said purchase, communicating formatted customer data securely to said POS store systems server and respective payment card industry (PCI) certified bank card processing network and communicating to the mobile tablet device that the customer payment card has been approved for scanned merchandise purchased;

whereby said system allows said customer to purchase a product from any retail store employee having said mobile scanner gun system receiving full product details, price, electronic and physical coupons, promotions, customer loyalty data and rewards, and to charge the purchase in a friendly, efficient, informative atmosphere without having the need to bring the product to a central checkout station and waiting in queue to check out.

2. A mobile scanner gun system as recited by claim 1, wherein an e-mail address of said customer is entered and a receipt is e-mailed to the customer if requested, and / or a hard copy of the receipt is transmitted to a central printer.

3. A mobile scanner gun system as recited by claim 1, wherein said EEPROM's previously programmed instruction set is present within said Main PCB and is integrated with said mobile tablet device and processes commands issued by mobile applications to command either said barcode scanner or said MSR to acquire required data.

4. A mobile scanner gun system as recited by claim 1, wherein said wireless communication may be in the form of Wi-Fi through a plurality of links located within the retail establishment and beyond or wireless cellular data plan through a standard cellular carrier.

5. A mobile scanner gun system as recited by claim 1, wherein said applications comprise an inventory management application in communication with the ERP inventory management applications for managing real-time daily store level inventory management functions from a mobile device within any store location.

6. A mobile scanner gun system as recited by claim 1, wherein said applications comprise a mobile POS application for processing customer check-out of purchases without consideration to the location of the inventory as the mobile POS application can initiate store and warehouse transfers, ship to customer location and special order from the vendor.

7. A mobile scanner gun system as recited by claim 1, wherein said attachment means comprises a rotating attachment means comprising a base mount universal receiver with rotational coupling means adapted to interchangeably mount the mobile tablet device on said top wall through said specialized universal serial bus wiring harness and communicate with the mobile tablet device.

8. A mobile scanner gun system as recited by claim 1, wherein said scanner input device has two drivers, including 1) a native device driver and 2) a keyboard input driver, said scanner input device being in communication with said trigger for initiating said scan of said barcode.

9. A mobile scanner gun system as recited by claim 1, wherein said attachment means comprises a base mount universal receiver with rotational coupling means for mounting said mobile tablet device further comprising a sliding mechanism via tongue and groove mating between said mobile tablet device upper receiver and said pistol grip base housing of said mobile scanner gun system.

10. A mobile scanner gun system as recited by claim 1, wherein said mobile tablet device housing comprises a rubberized frame for housing said mobile device.

11. A mobile scanner gun system for use with a mobile tablet device having USB payment card readers including a "Magnetic Stripe Reader" (MSR), "Europay, MasterCard and Visa" (EMV) reader and a "Near Field Communications" (NFC) reader and application software providing wireless secure communicative capability with a store systems server in a retail store, which is connected to a corporate Enterprise Resource Planning (ERP) system for processing a retail store point of sale (POS) transaction and real-time daily store level inventory management functions, comprising:
   a. a main body portion extending toward a handle portion forming a mobile scanner gun;
   b. said main body portion having a top wall, side walls, a front wall and a back wall constructed to form an interior cavity, wherein said front wall includes an aperture with a lens recessed therein;
   c. a plurality of Universal Serial Bus (USB) mobile input devices being in communication with said mobile scanner gun, including an MSR with a MSR slot, an EMV reader with an EMV slot and / or a Near Field Communications (NFC) reader through a specialized universal serial bus wiring harness;
   d. said handle portion having a trigger member in communication with said scanner engine for initiating a scan of a barcode;
   e. said top wall of said main body portion having an attachment means thereon, wherein said attachment means comprises a base mount universal receiver adapted to interchangeably mount a mobile tablet device housing further adapted to receive and house therein said mobile tablet device through a specialized universal serial bus wiring harness and communicate with said mobile tablet, said universal receiver and specialized universal serial bus wiring harness being removable from said top wall of said main body portion and adapted to be readily docked in different base housings including portable housings and fixed docked workstation housings thereby providing portability and interchangeability;
   f. a Main Printed Circuit Board (PCB) having a previously programmed Electrically Erasable Programmable Read-Only Memory (EEPROM) controlling all MSR, EMV, personal identification number (PIN) Entry Device (PED) or NFC operations and actions of said payment card input devices when a customer payment card is swiped through the MSR slot with or without the use of PIN Entry Device (PED) or by inserting a customer payment card into the EMV reader slot with or without the use of a PIN Entry Device (PED) or by "tapping" a customer payment card against the NFC reader for processing customer payment through the proper secured bank card processing network;
   g. activating said MSR, EMV or NFC operations causing said EEPROM of the Main PCB to communicate with said mobile tablet device, launching said application software to ready said mobile tablet device for receiving customer payment card data;
whereby said system allows for capability for a customer to purchase a product from any retail store employee having said mobile scanner gun system receiving full product details, price, electronic and physical coupons, promotions, customer loyalty data and rewards, and to charge the purchase in a friendly, efficient, informative atmosphere without having the need to bring the product to a central checkout station and waiting in queue to check out.

12. A mobile scanner gun system as recited by claim 11, wherein said application software provides communication with said corporate Enterprise Resource Planning (ERP) system server to obtain detailed information for daily inventory management purposes for tasks including physical inventory, cycle counting, inventory receiving, store to store transfers, return to vendor and product re-ticketing.

13. A mobile scanner gun system as recited by claim 11, wherein said application software communicates with said store system's server to obtain detailed information of said product scanned, its inventory, selling price, electronic and physical coupons, customer loyalty data and promotions available, and displaying product data on a display screen of said mobile tablet device.

14. A mobile scanner gun system as recited by claim 11, wherein said POS store systems server contacts a bank card authorization processor approving said purchase and communicating to the mobile tablet device that the customer payment card has been approved for scanned merchandise purchased.

15. A mobile scanner gun system as recited by claim 11, wherein said corporate ERP system adjusts the allocation of said product inventory visible chain-wide.

16. A mobile scanner gun system as recited by claim 11, wherein comprising a previously programmed Electrically Erasable Programmable Read-Only Memory (EEPROM) controlling all actions of said barcode scanner and said gun trigger for activating a scan operation of an item of interest to a customer by an employee of a retail establishment, wherein:
   1 said scan operation is adapted to cause said EEPROM of a Main Printed Circuit Board (PCB) to communicate with said mobile tablet device, launching said application software to ready said mobile tablet device for receiving a scanned barcode;
   2 said application communicates with said corporate Enterprise Resource Planning (ERP) system to obtain detailed information for daily inventory management purposes for such tasks as physical inventory, cycle counting, inventory receiving, store to store transfers, return to vendor and product re-ticketing;
   3 said EEPROM's previously programmed instruction set present within said Main PCB is integrated with said mobile tablet device and processes commands issued by mobile applications to command either said barcode scanner or said MSR to acquire required data.

17. A mobile scanner gun system as recited by claim 11, wherein said wireless communication may be in the form of Wi-Fi through a plurality of links located within the retail establishment and beyond or wireless cellular data plan through a standard cellular carrier.

18. A mobile scanner gun system as recited by claim 11, wherein said applications comprise a mobile POS application for processing customer check-out of purchases without consideration to the location of the inventory as the mobile POS application can initiate store and warehouse transfers, ship to customer location and special order from the vendor.

19. A mobile scanner gun system as recited by claim 11, wherein said attachment means comprises a rotating attachment means comprising a base mount universal receiver with rotational coupling means adapted to interchangeably mount the mobile tablet device housing on said top wall through said specialized universal serial bus wiring harness and communicate with the mobile tablet device.

20. A system providing a non-transitory computer readable electronic storage medium storing one or more programs comprising instructions executable by a portable multifunction device having a touch screen display and Internet capability to cause the device to: display an icon connected to an inventory management application associated with a corporate Enterprise Resource Planning (ERP) system that provides store level access on a mobile scanner gun system to the ERP system through a point of sale (POS) application; display an icon connected to the POS application that can process customer sales transactions within the store without limitation to a physical location of inventory within a retail chain; enabling the portable multifunction device to be operative to establish a connection between the portable multifunctional device and the mobile scanner gun system mountable thereon; wherein when triggered, the system provides relevant inventory information and POS transaction capability; as well as the ability to process a payment card transaction through a magnetic stripe reader (MSR) slot with or without the use of a PIN Entry Device (PED) or a Europay, MasterCard, and Visa (EMV) slot with or without the use of the PED or tapping on a near field communications (NFC) reader.

* * * * *